(12) United States Patent
Sabat et al.

(10) Patent No.: US 12,112,359 B2
(45) Date of Patent: *Oct. 8, 2024

(54) METHOD AND SYSTEM FOR FACILITATING INVOICE DATA, PAYMENT CREDIT TRANSFERS, REAL-TIME PACKAGE TRACKING, AND ACCOUNT-TO-ACCOUNT PAYMENT ON DELIVERY

(71) Applicant: Mastercard International Incorporated, Purchase, NY (US)

(72) Inventors: Viviane Sabat, New York, NY (US); Andrea Christine Gilman, Chappaqua, NY (US); Jennifer Wang, Corona, NY (US); Abhinav Bhatt, Rye Brook, NY (US); Chhomthyda Chhuan, Astoria, NY (US); Daniel Bae, Greenwich, CT (US); Alonso Araujo, New York, NY (US); James Nicholas Mortimer, Buckinghamshire (GB); Monica Taylor, Saint Charles, MO (US); Eitan Ahimor, White Plains, NY (US); Christopher Murray, Ballwin, MO (US); Mark N. Savoye, Hartsdale, NY (US); Robert Pacifico, Ridgefield, CT (US); Ashfaq Kamal, White Plains, NY (US); Karan Sharma, Rye Brook, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/144,299

(22) Filed: May 8, 2023

(65) Prior Publication Data

US 2023/0274325 A1 Aug. 31, 2023

Related U.S. Application Data

(63) Continuation of application No. 16/874,939, filed on May 15, 2020, now Pat. No. 11,687,986.

(Continued)

(51) Int. Cl.
*G06Q 30/04* (2012.01)
*G06F 16/25* (2019.01)
(Continued)

(52) U.S. Cl.
CPC .......... *G06Q 30/04* (2013.01); *G06F 16/258* (2019.01); *G06Q 10/0838* (2013.01);
(Continued)

(58) Field of Classification Search
None
See application file for complete search history.

(56) References Cited

U.S. PATENT DOCUMENTS

| 8,364,590 B1 * | 1/2013 | Casey ................ G06Q 20/3274 |
| | | 705/42 |
| 8,676,617 B2 | 3/2014 | Berger et al. |

(Continued)

FOREIGN PATENT DOCUMENTS

| EP | 3970106 A1 | 3/2022 |
| WO | 2008/011102 A2 | 1/2008 |

(Continued)

OTHER PUBLICATIONS

Notification of Transmittal of the International Search Report (Form PCT/ISA/210) and the Written Opinion of the International Searching Authority (Form PCT/ISA/237) issued Oct. 30, 2020, by the International Application Division Korean Intellectual Property Office in corresponding International Appliction No. PCT/US2020/033045 (13 pages).

(Continued)

*Primary Examiner* — Paul S Schwarzenberg

(74) *Attorney, Agent, or Firm* — Panitch Schwarze Belisario & Nadel LLP

(57) ABSTRACT

A method for real-time invoice updating and account-to-account payment includes: receiving invoice data based on presentation of an invoice by a distributor to a recipient at a delivery location, modification of the invoice by the recipient, and acceptance of the invoice by the recipient; generating a request for payment (RFP) message based on the invoice data; transmitting the RFP message to a financial institution associated with the recipient via a financial institution of the distributor; receiving, from the financial institution associated with the distributor, a payment confirmation for the invoice based on a real-time payment from the financial institution associated with the recipient; generating reconciliation data based on the payment confirmation and the invoice data; and transmitting the reconciliation data to a computing device of the distributor and a computing device of the recipient.

14 Claims, 21 Drawing Sheets

Related U.S. Application Data

(60) Provisional application No. 62/932,945, filed on Nov. 8, 2019, provisional application No. 62/915,817, filed on Oct. 16, 2019, provisional application No. 62/898,842, filed on Sep. 11, 2019, provisional application No. 62/848,141, filed on May 15, 2019.

(51) Int. Cl.
| | | |
|---|---|---|
| *G06Q 10/083* | (2023.01) | |
| *G06Q 10/0875* | (2023.01) | |
| *G06Q 10/1093* | (2023.01) | |
| *G06Q 20/10* | (2012.01) | |
| *G06Q 20/40* | (2012.01) | |
| *G06Q 30/0601* | (2023.01) | |
| *G06Q 40/03* | (2023.01) | |
| *G06F 3/04883* | (2022.01) | |

(52) U.S. Cl.
CPC ..... *G06Q 10/0875* (2013.01); *G06Q 10/1095* (2013.01); *G06Q 20/108* (2013.01); *G06Q 20/401* (2013.01); *G06Q 30/0635* (2013.01); *G06Q 40/03* (2023.01); *G06F 3/04883* (2013.01)

(56) References Cited

U.S. PATENT DOCUMENTS

| | | | |
|---|---|---|---|
| 8,732,044 B2 * | 5/2014 | Lovelett | G06Q 20/10 705/38 |
| 9,940,616 B1 * | 4/2018 | Morgan | G06Q 20/3224 |
| 11,687,986 B2 | 6/2023 | Sabat et al. | |
| 2004/0167852 A1 * | 8/2004 | Cutler | G06Q 20/04 705/39 |
| 2010/0125521 A1 | 5/2010 | Hanan et al. | |
| 2013/0246245 A1 | 9/2013 | Sun et al. | |
| 2016/0063435 A1 * | 3/2016 | Shah | G06Q 30/0633 705/44 |
| 2020/0349571 A1 * | 11/2020 | Patel | G06Q 30/06 |

FOREIGN PATENT DOCUMENTS

| | | | | |
|---|---|---|---|---|
| WO | 2014027883 A1 | | 2/2014 | |
| WO | WO-2017142997 A1 | * | 8/2017 | ........ G06Q 20/027 |
| WO | 2020232328 A1 | | 11/2020 | |

OTHER PUBLICATIONS

Extended European Search Report dated Dec. 13, 2022 in corresponding EP Application No. 20806182.0-1218, 12 pps.
Requisition by the Examiner, dated Jan. 30, 2024, issued in corresponding Canadian Application No. 3,138,910, 3 pages.
Written Opinion, issued May 15, 2024, in corresponding Singaporean Application No. 11202111603R, 7 pages.

* cited by examiner

METHOD AND SYSTEM FOR FACILITATING INVOICE DATA, PAYMENT CREDIT TRANSFERS, REAL-TIME PACKAGE TRACKING, AND ACCOUNT-TO-ACCOUNT PAYMENT ON DELIVERY

RELATED APPLICATIONS

U.S. Provisional Application No. 62/848,141, filed May 15, 2019, U.S. Provisional Application No. 62/898,842, filed Sep. 11, 2019, U.S. Provisional Application No. 62/915,817 filed on Oct. 16, 2019, and U.S. Provisional Application No. 62/932,945, filed Nov. 8, 2019, are hereby incorporated by reference in their entirety and for all purposes.

FIELD

The present disclosure relates to a system and method for real-time updating, tracking, and notification of delivery, sales, and instant account-to-account payment on delivery or sale. Specifically, the use of dynamic updating of invoice and payment details during, before, and after delivery or sale increases efficiency in delivery of goods and reduces reconciliation costs.

BACKGROUND

As the Internet and other forms of remote shopping increase in usage by consumers, the number of packages that are delivered throughout the world also increases. As a result, package delivery services have made efforts to increase their capacity to deliver packages to consumers or businesses. For instance, many services utilize longer hours and additional days in order to increase the number of packages that they can deliver, to account for increases in the number of packages ordered.

However, an increase in capacity without an increase in efficiency may limit delivery services' ability to satisfy the needs of all of their customers. For instance, such delivery services (e.g., distributors) provide preset goods and corresponding invoice to a recipient with no ability to adjust what goods are actually delivered. Further, such invoices are often in the form of a paper or a preset electronic form leading to high reconciliation and operating expenses, working capital issues, and low cash management transparency. Due to ineffective notifications to recipients, distributors often face other pain points such as long wait times at the place of delivery. Lastly, banks and other financial institutions currently do not have the technological capabilities to facilitate robust data with real-time account-to-account payment or connect to an enterprise resource planning (ERP) system.

Additionally, for delivery of products from a supplier to a buyer, conventionally there may be multiple systems involved, such as one for invoicing, one for inventory, one for scheduling and one for navigation of the delivery.

Thus, there is a need for a technical solution to permit the ability to adjust goods and invoices by delivery services on-the-fly during delivery, minimize wait times of distributors for payment, and facilitate real-time account-to-account payment upon delivery of goods or services.

SUMMARY

A method for real-time invoice updating and account-to-account payment includes one or more of the following steps. A receiving device of a processing server may receive invoice data based on presentation of an invoice by a distributor to a recipient at a delivery location, modification of the invoice by the recipient, and acceptance of the invoice by the recipient. A processing device of the processing server may generate a request for payment (RFP) message based on the invoice data. A transmitting device of the processing server may transmit the RFP message to a financial institution associated with the recipient via a financial institution of the distributor. The receiving device of the processing server may receive, from the financial institution associated with the distributor, a payment confirmation for the invoice based on a real-time payment from the financial institution associated with the recipient. The processing device of the processing server may generate reconciliation data based on the payment confirmation and the invoice data. The transmitting device of the processing server may transmit the reconciliation data to a computing device of the distributor and a computing device of the recipient.

A system for real-time invoice updating and account-to-account payment includes a receiving device of a processing server, a transmitting device of the processing server, and a processing device of the processing server. The receiving device of the processing server may be configured to receive invoice data based on presentation of an invoice by a distributor to a recipient at a delivery location, modification of the invoice by the recipient, and acceptance of the invoice by the recipient. The receiving device of the processing server may also be configured to receive a payment confirmation for the invoice, from a financial institution associated with the distributor, based on a real-time payment from a financial institution associated with the recipient. The processing device of the processing server may be configured to generate a request for payment (RFP) message based on the invoice data. The processing device of the processing server may also be configured to generate reconciliation data based on the payment confirmation and the invoice data. The transmitting device of the processing server may be configured to transmit the RFP message to the financial institution associated with the recipient via the financial institution of the distributor. The transmitting device of the processing server may also be configured to transmit the reconciliation data to a computing device of the distributor and a computing device of the recipient.

A method for real-time sales order updating and account-to-account payment includes one or more of the following steps. A receiving device of a sales computing device receives a schedule of appointments with users. The sales computing device displays at least a portion of the schedule and a best seller list of products in a single user interface. The sales computing device displays a graphical representation of a sales history of a particular user. The sales computing device also displays multiple financing options with a minimum payment based on an available credit of the particular user. The sales computing devices sends, to a processing server, invoice data including selected financing information and the minimum payment.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have or require any special knowledge in offered products. In some embodiments, an entity involved in a single transaction may be considered a merchant. In some instances, as used herein, the term "merchant" may refer to an apparatus or device of a merchant entity.

System for Real-Time Update and Notification for Delivery

Figure 1:
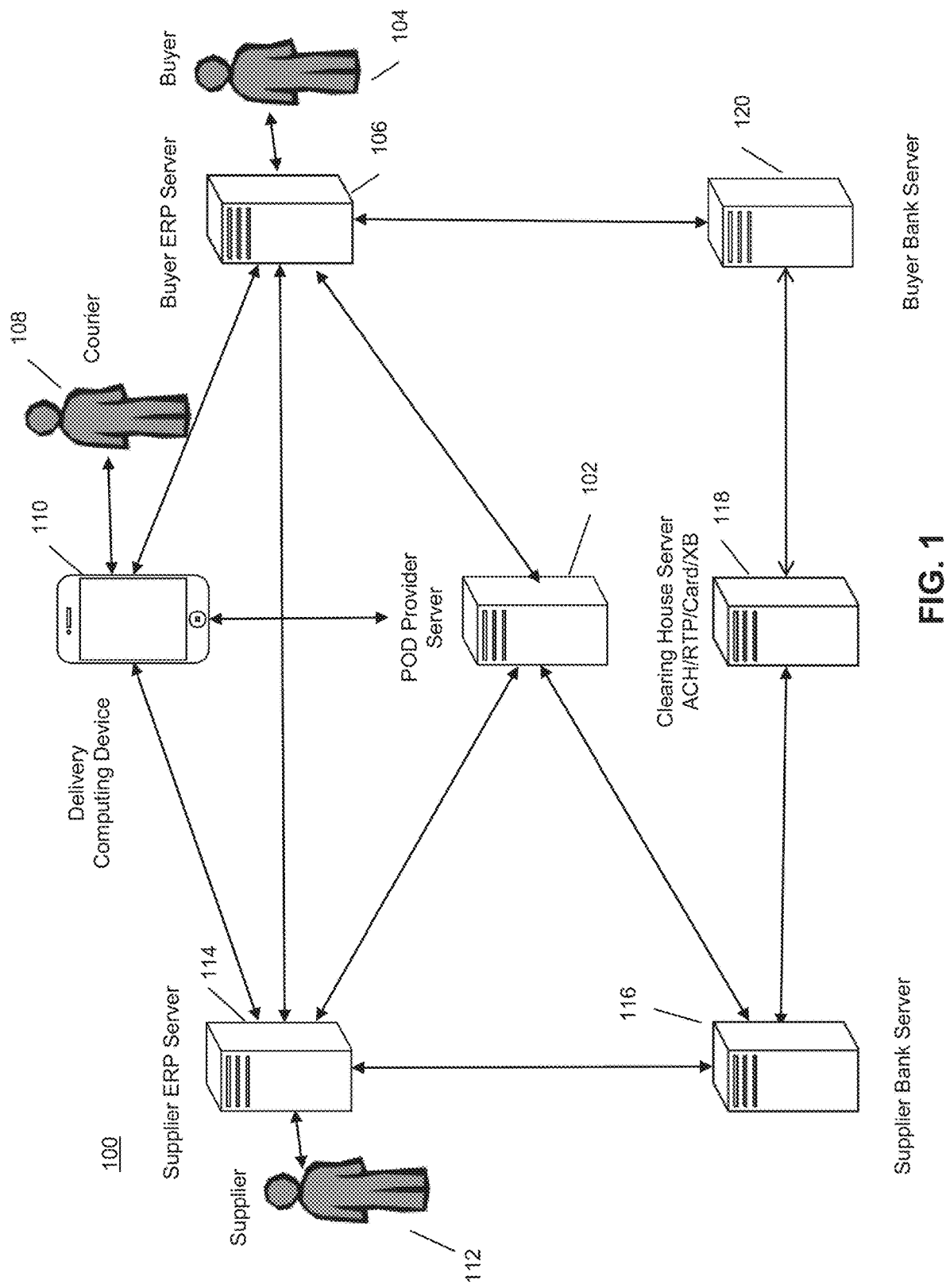
FIG. 1 is a block diagram illustrating a high-level system architecture for increasing efficiency and permitting real-time account-to-account payments in delivery in accordance with exemplary embodiments.

FIG. 1 illustrates a system 100 for payment on delivery and/or sales with real-time package or service delivery invoice updating and account-to-account payment. It should be noted that package delivery is being used as an example, but the disclosed technology could also be used for other purposes, such as services (e.g., plumber, electrician, and other services that are on location, for example). The system 100 may include a payment on delivery (POD) provider server 102 (also referred to herein as a processing server 102), a buyer 104, a buyer enterprise resource planning (ERP) server 106, a courier 108, a delivery computing device 110 of the courier 108, a supplier 112, a supplier ERP server 114, a supplier bank server 116, a clearing house server 118, and/or a buyer bank server 120, each of which will be discussed in additional detail below.

A supplier 112 may distribute one or more goods to a buyer 104 in response to a request to purchase the one or more goods by the buyer 104. For instance, the buyer 104 may conduct an e-commerce transaction at a website or via an application program of the supplier 112, an in-person transaction where one or more selected products are purchased that must be shipped, etc. In some cases, the buyer 104 may be a merchant or retailer that resells the one or more goods to an end consumer. In some cases, the buyer 104 may be an end user of the one or more goods.

The buyer 104 may be associated with the buyer ERP server 106 and register the buyer ERP server 106 with the processing server 102. The buyer ERP server 106 may be responsible for managing and tracking transactions of the buyer 104. To this end, the buyer ERP server 106 may store financial information and transaction information for presentation to the buyer 104. The buyer ERP server 106 may also be responsible for providing authorization to the buyer bank server 120 to debit a particular account of the buyer 104 to be sent to an account of the supplier 112 in exchange for one or more goods. The buyer ERP server 106 may be embodied as a computing device as described in FIG. 8 and communicate with one or more of the processing server 102, the supplier ERP server 114, the delivery computing device 110, and the buyer bank server 120 via one or more wired and/or wireless networks (e.g., the Internet, wide area network, and/or local area network). For instance, the buyer ERP server 106 may transmit a location of the buyer (e.g., address of the buyer's restaurant) and contact information (e.g., telephone number) to the processing server 102. The buyer EPR server 106 may receive account information of the buyer 104 for the buyer bank server 120.

The supplier 112 may be associated with the supplier ERP server 114 and register the supplier ERP server 114 with the processing server 102. The supplier ERP server 114 may be responsible for managing and tracking transaction of the supplier 112. To this end, the supplier ERP server 114 may store financial information and transaction information for presentation to the supplier 112. The supplier ERP server 114 may be embodied as a computing device as described in FIG. 8 and communicate with one or more of the processing server 102, the delivery computing device 110, the buyer ERP server 106 and the supplier bank server 116 via one or more wired and/or wireless networks (e.g., the Internet, wide area network, and/or local area network). For instance, the supplier ERP server 114 may transmit an invoice for the buyer 104 to the processing server 102. The invoice may include a quantity and type of goods. The invoice may also include a price per good and a total payment amount. The supplier EPR server 114 may receive account information of the supplier 112 for the supplier bank server 116.

Goods of the supplier 112 may be delivered to the buyer 104 via courier 108, which may be associated with delivery computing device 110. The courier 108 may, for example, be a driver that delivers picks up goods from the supplier 112 for delivery to one or more buyers 104. The supplier may append unique identifications values (e.g., machine-readable codes) to packages (e.g., goods) to track distribution of the packages and inventory. The values may be transmitted to the delivery computing device 110 either directly or via the processing server 102.

Figure 8:
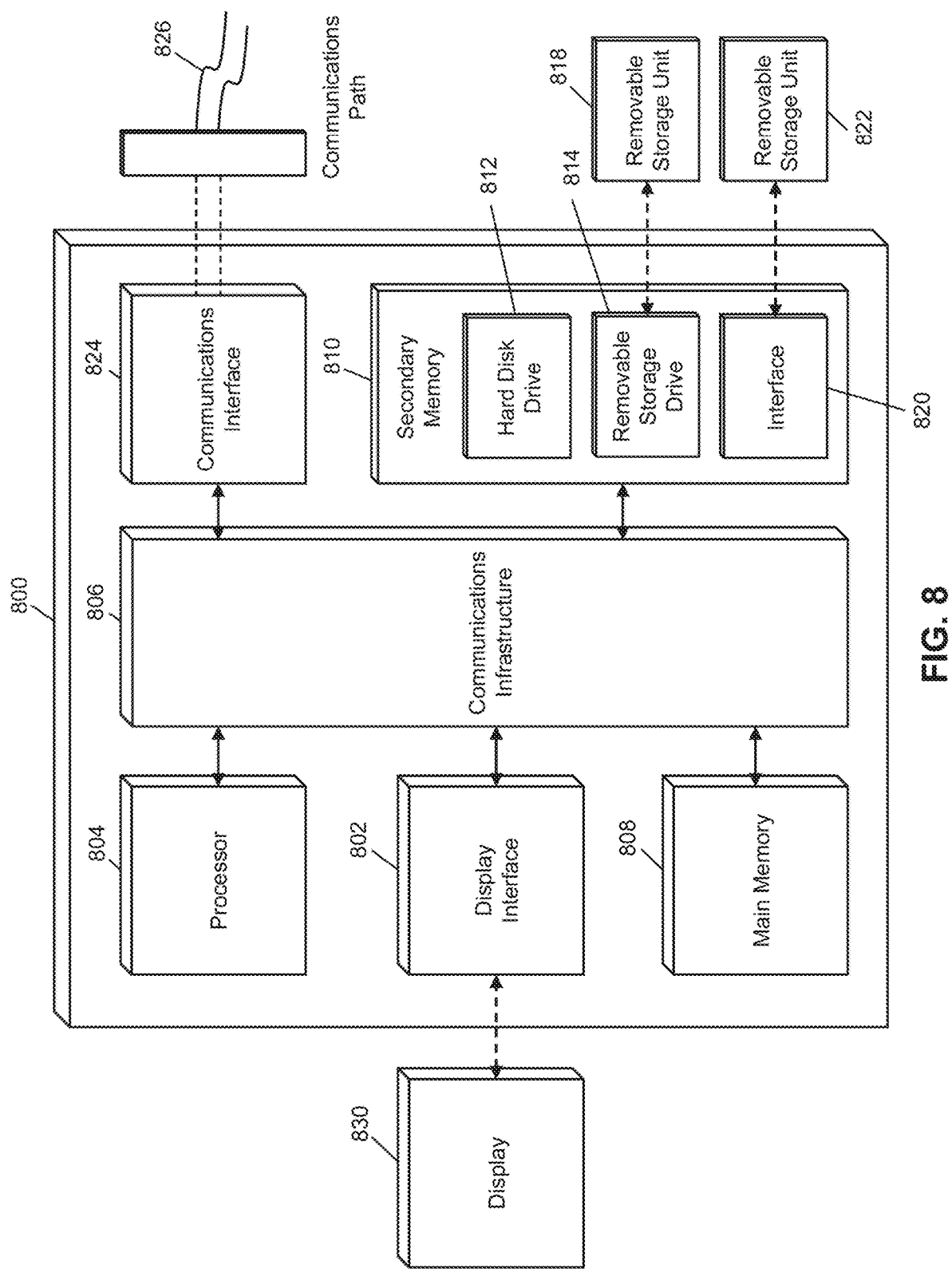
FIG. 8 is a block diagram illustrating a computer system architecture in accordance with exemplary embodiments.

The delivery computing device 108 may be embodied as a computing device as described in FIG. 8 and communicate with one or more of the processing server 102, the buyer ERP server 106 and the supplier ERP server 114 via one or more wired and/or wireless networks (e.g., the Internet, wide area network, and/or local area network).

The delivery computing device 110 may be a mobile computing device (e.g., smartphone, tablet, laptop, etc.) with a payment on delivery (POD) software application installed thereon. The POD software application may facilitate real-time invoice updating and account-to-account payment for delivery of a package (e.g., goods) as described in additional detail below. The POD software application may be downloaded by the delivery computing device 110 from the processing server 102. The delivery computing device 110, via execution of the POD software application, may obtain information from the processing server 102 for display to the courier 108 and/or buyer 104. Such information may include a schedule for delivering various goods to various different buyers, transaction information (e.g., invoices) for each buyer including an amount and type of goods, and routing information based on the locations of the buyers. The delivery computing device 110 may present (e.g., display) the schedule to the courier 108 so that the courier 108 may deliver goods to one or more buyers in accordance with the schedule. To this end, the delivery computing device 110 may also display route guidance to each buyer 104 as the courier 108 delivers goods to each buyer 104 according to the schedule. Having the route guidance integrated with the POD can provide technical advantages such as geo and time stamp of transactions, and provides one integrated interface, thus improving interactions with the user, depending on actual implementation.

Once the courier 108 arrives at a location of the buyer 104 (e.g., a restaurant) to deliver goods ordered by the buyer 104, the courier 108 may present the buyer with the invoice specific to the buyer for delivery of the goods. For instance, the courier 108 may display the invoice using the delivery computing device 110. The buyer 104 may use the delivery computing device 110 to adjust the quantity and type of goods to be purchased and delivered. The delivery computing device 110 may dynamically update the invoice for presentation to the buyer 104. Once the buyer 104 inputs the buyer's acceptance into the delivery computing device 110, the delivery computing device 110 may, in turn, generate invoice data and transmit the invoice data to the processing server 102 for account-to-account payment between the buyer 104 and the supplier 112.

The processing server 102, discussed in more detail below, may be configured to provide for real-time account-to-account payment for the delivery of a package to the buyer 104 from the courier 106. The processing server 102 may be embodied as a computing device as described in FIG. 8 and communicate with one or more of the ERP server 106, the supplier ERP server 114, the delivery computing device 110, and the supplier bank server 116 via one or more wired and/or wireless networks (e.g., the Internet, wide area network, and/or local area network). The processing server 102 may receive the invoice data and generate a request for payment (RFP) message based on the invoice data to facilitate an account-to-account payment.

The supplier bank server 116 may be responsible for managing a financial account of the suppler 112. For instance, the supplier 112 may have a particular account with the supplier bank server 116, which may be identified using an account number. The account may include an amount of funds available to the supplier 112. The supplier bank server 116 may be embodied as a computing device as described in FIG. 8 and communicate with one or more of the supplier ERP server 114, the processing server 102, and the clearing house server 118 via one or more wired and/or wireless networks (e.g., the Internet, wide area network, and/or local area network).

The buyer bank server 120 may be responsible for managing a financial account of the buyer 104. For instance, the buyer 104 may have a particular account with the buyer bank server 120, which may be identified using an account number. The account may include an amount of funds available to the buyer 104. The buyer bank server 120 may be embodied as a computing device as described in FIG. 8 and communicate with one or more of the buyer ERP server 106, the processing server 102, and the clearing house server 118 via one or more wired and/or wireless networks (e.g., the Internet, wide area network, and/or local area network).

The clearing house server 118 may be responsible for facilitating communications between the supplier bank server 116 and the buyer bank server 120. The clearing house server includes one or more payment rails (e.g., automated clearing house (ACH), real-time payments (RTP), card and cross-border payment (XB) rails) to transfer messages and/or funds between accounts of the supplier bank server 116 and the buyer bank server 120.

Using the above system, the efficiency of package delivery may be increased. For instance, by facilitating real-time adjustments to an invoice and account-to-account payment during delivery, the time taken to deliver the desired goods is reduced, thus increasing efficiency and capacity. It also can register an inventory of products on the delivery vehicle, and modify the inventory records as to count, delivery locations, and other information due to these functions being integrated into one computer program. As a result, the delivery computing device 110 and/or the processing server 102 provide a technical improvement over existing systems by providing updates to invoices in real-time and payment on delivery.

While only one buyer 104, buyer ERP server 106, courier 108, delivery computing device 110, supplier 112, supplier ERP server 114, suppler bank server 116, and buyer bank server 120 are depicted in FIG. 1, it should be understood that multiple the system 100 may include multiple buyers, buyer ERP servers, couriers, delivery computing devices, suppliers, supplier ERP servers, suppler bank servers, and buyer bank servers.

In one or more additional or alternative embodiments, system 100 may include a sales person (not shown) that has a sales computing device (not shown). Prior to delivery of goods, a sales person may travel to each of the locations of the buyers 104 to take orders for the goods directly from buyers 104. The sales computing device may be a mobile computing device (e.g., smartphone, tablet, laptop, etc.) with a payment on delivery (POD) software application installed thereon. The POD software application may facilitate real-time invoice updating and account-to-account payment for goods to be delivered or services to be rendered as described in additional detail below. The POD software application may be downloaded by the sales computing device from the processing server 102. The sales computing device, via execution of the POD software application, may obtain information from the processing server 102 for display to the sales person and/or buyer 104. Such information may include a schedule of appointments of the sales person to meet with various buyers 104, best seller information, sales history, buyer order details, invoice details, financing options, buyer's current balance and available credit, and the like.

The sales computing device may be embodied as a computing device as described in FIG. 8 and communicate with one or more of the processing server 102, the buyer ERP server 106 and the supplier ERP server 114 via one or more wired and/or wireless networks (e.g., the Internet, wide area network, and/or local area network).

While the sale person and the sales computing device are not shown in FIG. 1, they have a similar relationship in system 100 with other devices and persons as courier 108 and delivery computing device 110, respectively.

Figure 2:
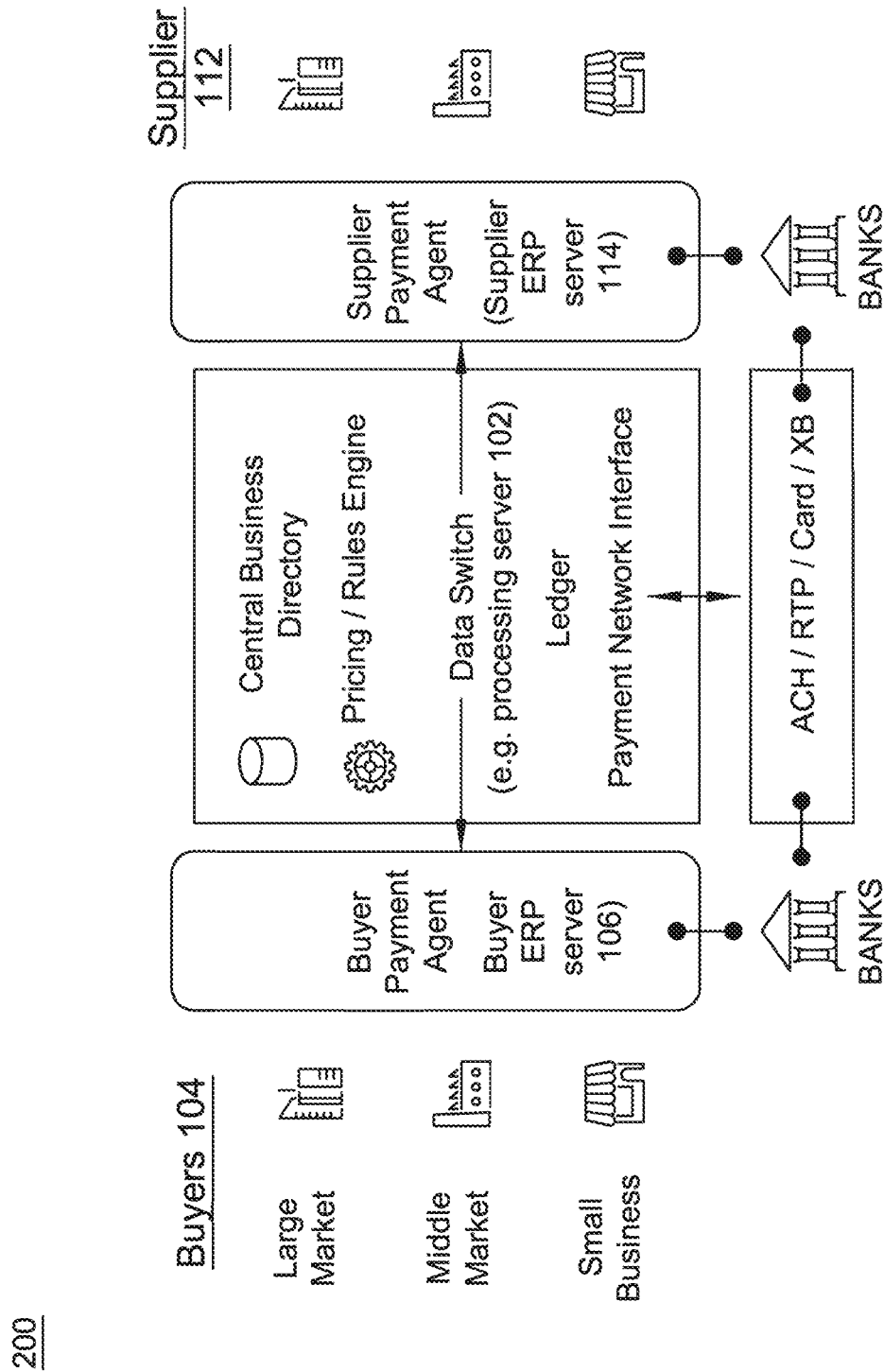
FIG. 2 is another block diagram illustrating a high-level system architecture in accordance with exemplary embodiments.

FIG. 2 illustrates a functional overview 200 for payment on delivery with real-time package delivery invoice updating and account-to-account payment. The overview 200 is an example implementation of the system 100 of FIG. 1. In this implementation, the buyer 104 may be one of a large market buyer, middle market buyer, or a small business. The buyer ERP server 106 may include a buyer payment agent, which may be software responsible for performing functions discussed above in connection with the buyer ERP server 106. Similarly, the supplier ERP server 114 may include a supplier payment agent, which may be software responsible for performing functions discussed above in connection with the supplier ERP server 114.

In this implementation, the processing server 102 may operate as a data switch between the buyer payment agent and the supplier payment agent. The processing server 102 may also include a central business directory for storing contact information (e.g., address, phone number) of suppliers and buyers. The central business directory may also store network address (e.g., IP addresses) and/or device identifiers (e.g., MAC addresses) of various devices (e.g., supplier ERP server 114, buyer ERP server 106, delivery computing device 110, supplier bank server 116, etc.).

The processing server 102 may include a pricing/rules engine, which may determine pricing of goods for a supplier on a per good basis or group of goods basis. The pricing rules may be transmitted to the delivery computing device 110 to enable dynamic updating of invoices based on adjustments made by the buyer 104 during delivery of the goods. The processing server 102 may also store and update a ledger of transactions and deliveries of goods to buyers to transmit to the supplier ERP server 114 and/or the buyer ERP server 106.

The processing server 102 may also provide other value added services to the supplier ERP server 114 and/or the buyer ERP server 106.

Processing Server

Figure 3:
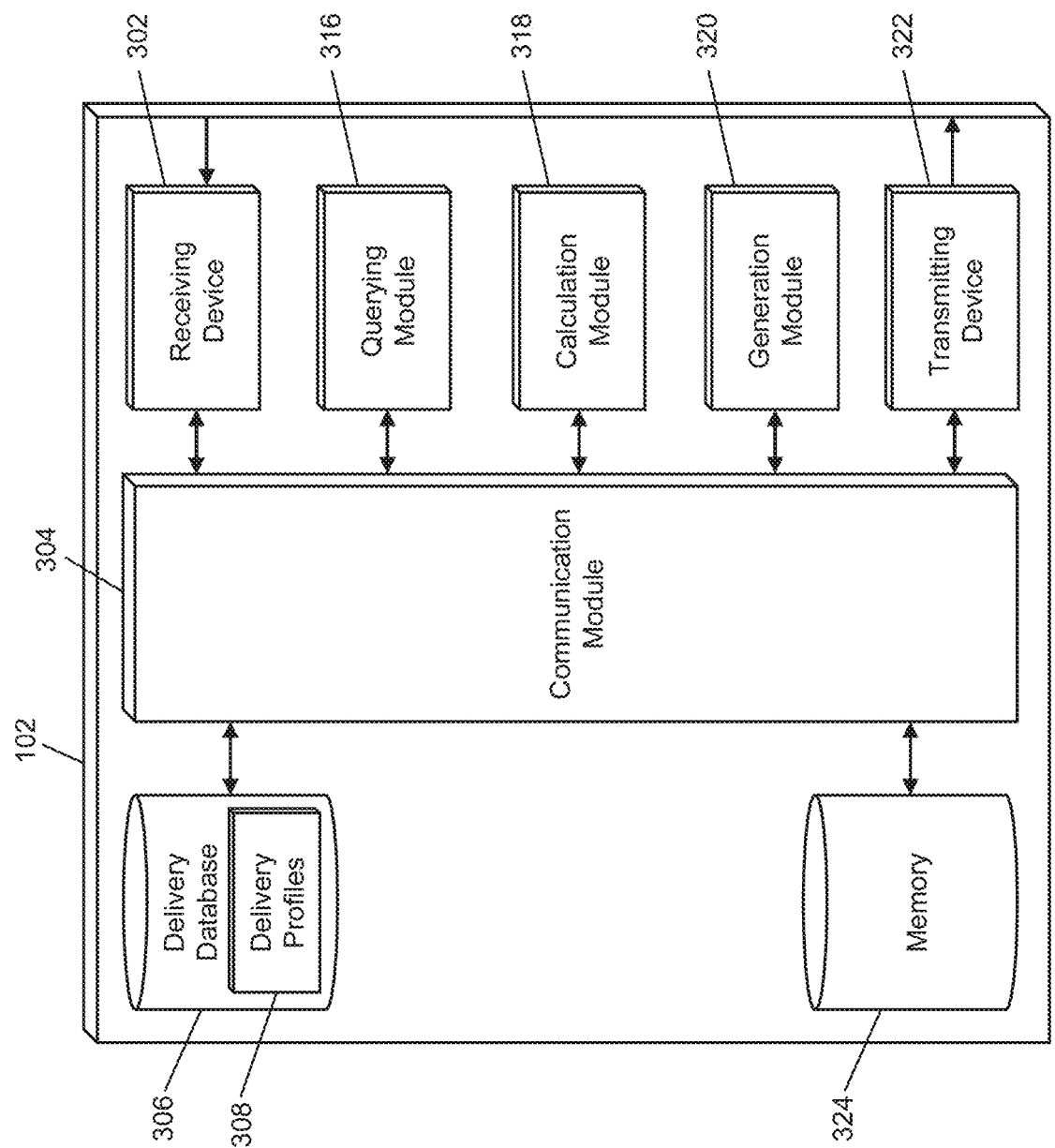
FIG. 3 is a block diagram illustrating a processing server for use in the system of FIG. 1 for increasing efficiency and permitting real-time account-to-account payments in delivery in accordance with exemplary embodiments.

FIG. 3 illustrates an embodiment of a processing server 102 in the system 100. It will be apparent to persons having skill in the relevant art that the embodiment of the processing server 102 illustrated in FIG. 3 is provided as illustration only and may not be exhaustive to all possible configurations of the processing server 102 suitable for performing the functions as discussed herein. For example, the computer system 800 illustrated in FIG. 8 and discussed in more detail below may be a suitable configuration of the processing server 102.

The processing server 102 may include a receiving device 302. The receiving device 302 may be configured to receive data over one or more networks via one or more network protocols. In some instances, the receiving device 302 may be configured to receive data from various servers (e.g., supplier ERP server 114, buyer ERP server 106, supplier bank server 116, etc.), delivery computing devices 110, and other systems and entities via one or more communication methods, such as radio frequency, local area networks, wireless area networks, cellular communication networks, Bluetooth, the Internet, etc. In some embodiments, the receiving device 302 may be comprised of multiple devices, such as different receiving devices for receiving data over different networks, such as a first receiving device for receiving data over a local area network and a second receiving device for receiving data via the Internet. The receiving device 302 may receive electronically transmitted data signals, where data may be superimposed or otherwise encoded on the data signal and decoded, parsed, read, or otherwise obtained via receipt of the data signal by the receiving device 302. In some instances, the receiving device 302 may include a parsing module for parsing the received data signal to obtain the data superimposed thereon. For example, the receiving device 302 may include a parser program configured to receive and transform the received data signal into usable input for the functions performed by the processing device to carry out the methods and systems described herein.

The receiving device 302 may be configured to receive data signals that are superimposed or may be otherwise encoded with invoice data, which may be electronically transmitted by the delivery computing device 110. The receiving device 202 may also be configured to receive data signals superimposed or otherwise encoded with payment confirmation, which may be electronically transmitted by the supplier bank server 116.

The processing server 102 may also include a communication module 304. The communication module 304 may be configured to transmit data between modules, engines, databases, memories, and other components of the processing server 102 for use in performing the functions discussed herein. The communication module 304 may be comprised of one or more communication types and utilizes various communication methods for communications within a computing device. For example, the communication module 304 may be comprised of a bus, contact pin connectors, wires, etc. In some embodiments, the communication module 304 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 316, calculation module 318, generation module 320, etc. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 102 may include a delivery database 306. The delivery database 306 may be configured to store information received from various servers and devices depicted in FIG. 1. The delivery database 306 may be a relational database that utilizes structured query language for the storage, identification, modifying, updating, accessing, etc. of structured data sets stored therein. The received information may be a structured data set configured to store data related to a package delivery, and may include network addresses, contact information, invoices, and other information described herein.

The processing server 102 may include a querying module 316. The querying module 316 may be configured to execute queries on databases to identify information. The querying module 316 may receive one or more data values or query strings, and may execute a query string based thereon on an indicated database, such as the delivery database 306, to identify information stored therein. The querying module 316 may then output the identified information to an appropriate engine or module of the processing server 102 as necessary. The querying module 316 may, for example, execute a query on the delivery database 306 to identify particular information discussed herein.

The processing server 102 may also include a calculation module 318. The calculation module 318 may be configured to perform calculations for the processing server 102 as discussed herein. The calculation module 318 may receive instructions for a calculation as input, may perform the calculation, and may output the result of the calculation to another module or engine of the processing server 102. In some cases, the input may include data to be used in the calculation. In other cases, the calculation module 318 may be configured to identify data for use in the calculation. In an example, the calculation module 318 may be configured to calculate a schedule and routing guidance.

The processing server 102 may also include a generation module 320. The generation module 320 may be configured to generate data for use in performing the functions of the processing server 102 as discussed herein. The generation module 320 may receive an instruction as input, may generate data as instructed, and may output the generated data to another module or engine of the processing server 102.

The processing server 102 may also include a transmitting device 322. The transmitting device 322 may be configured to transmit data over one or more networks via one or more network protocols. In some instances, the transmitting device 322 may be configured to transmit data to servers, delivery computing devices 110, and other entities via one or more communication methods, local area networks, wireless area networks, cellular communication, Bluetooth, radio frequency, the Internet, etc.

In some embodiments, the transmitting device 322 may be comprised of multiple devices, such as different transmitting devices for transmitting data over different networks, such as a first transmitting device for transmitting data over a local area network and a second transmitting device for transmitting data via the Internet. The transmitting device 322 may electronically transmit data signals that have data superimposed that may be parsed by a receiving computing device. In some instances, the transmitting device 322 may include one or more modules for superimposing, encoding, or otherwise formatting data into data signals suitable for transmission.

The transmitting device 322 may be configured to electronically transmit data signals to supplier bank server 116, which may be superimposed or otherwise encoded with a request for payment (RFP) message to facilitate an account-to-account payment between the buyer 104 and the supplier 112. The transmitting device 322 may also be configured to electronically transmit data signals to suppler ERP server 114 and buyer ERP server 106, which may be superimposed or otherwise encoded with reconciliation data.

The processing server 102 may also include a memory 324. The memory 324 may be configured to store data for use by the processing server 102 in performing the functions discussed herein, such as public and private keys, symmetric keys, etc. The memory 324 may be configured to store data using suitable data formatting methods and schema and may be any suitable type of memory, such as read-only memory, random access memory, etc. The memory 324 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 324 may be comprised of or may otherwise include a relational database that utilizes structured query language for the storage, identification, modifying, updating, accessing, etc. of structured data sets stored therein. The memory 324 may be configured to store, for example, any information received or generated by the processing server 102.

Process for Real-Time Invoice Updating

Figure 4:
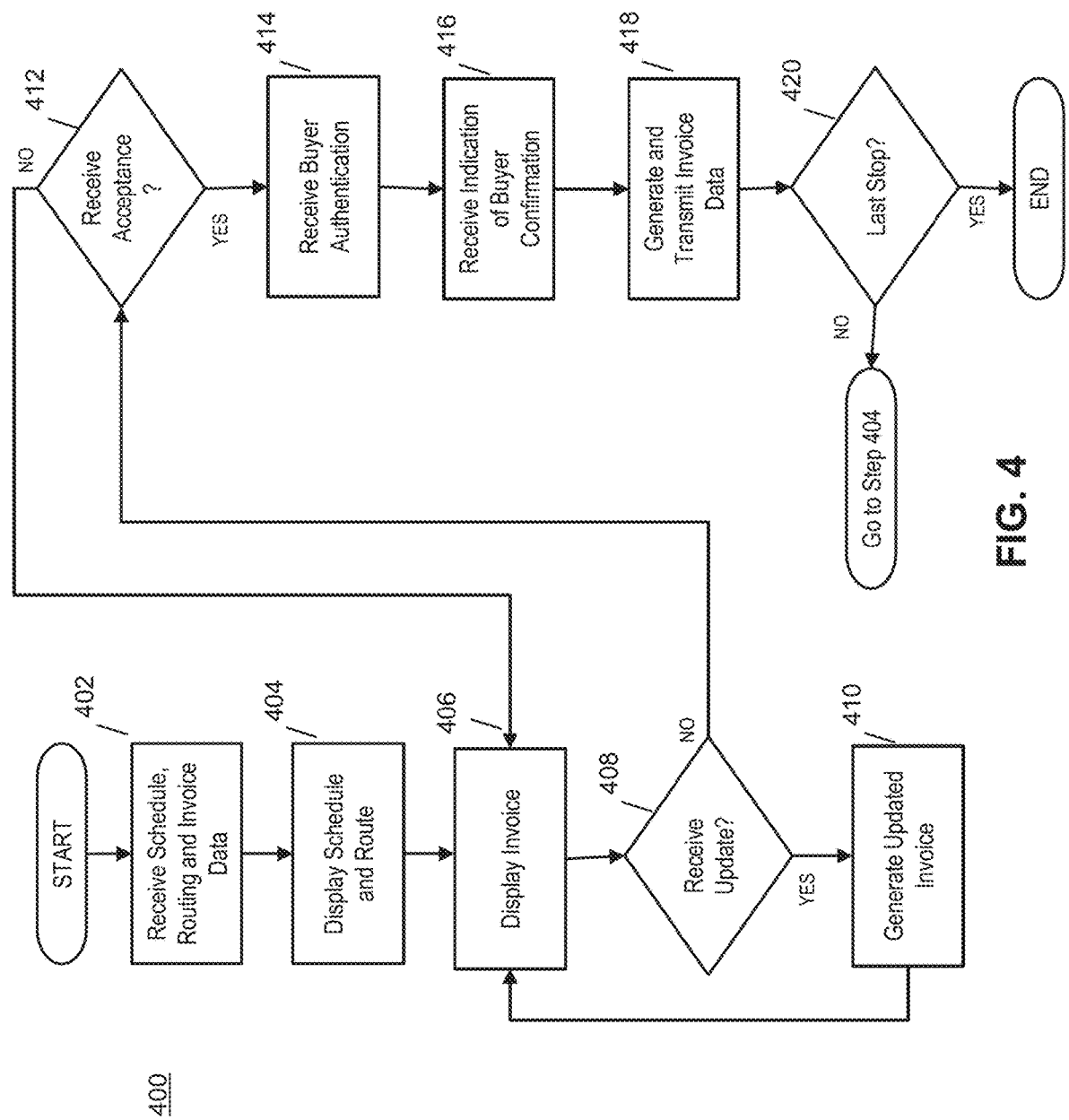
FIG. 4 is a flow diagram illustrating a process for increasing efficiency and permitting real-time account-to-account payments in delivery using a software application installed on a mobile computing device in accordance with exemplary embodiments.

FIG. 4 illustrates a process 400 executed by the delivery computing device 110 of the system 100 for the real-time invoice updating and account-to-account payment. Prior to starting process 400, the courier 108 of the distributor may obtain the delivery computing device 110 running a software application (e.g., a payment on delivery mobile app as described herein) installed thereon. The software application may be configured to perform one or more steps of FIG. 4. For instance, the software application may cause the delivery computing device 110 to present one or more user interfaces depicted in FIGS. 5A-5C as will be described in detail below.

A supplier 112 may deliver goods to a buyer 104 through the use of a courier 108. At step 402, the courier's delivery computing device 110 (e.g., tablet computer) may include a POD software application (e.g., mobile app) that may receive scheduling, routing, and invoice information from the processing server 102. The scheduling information may include a schedule of a list of buyers and times to deliver goods to each of the buyers. The schedule information may also include an address and contact information of each of the buyers. The routing information may include route guidance from one buyer to the next buyer for use by the courier 108 as the courier delivers goods according to various buyers according to the schedule. In some cases, rather than receiving routing guidance from the processing server 102, the delivery computing device 110 may include a global positioning system and generate routing guidance locally. The invoices information may include a separate invoice for each buyer. The invoice for a particular buyer may include, for example, an itemized list of goods to be delivered, a per-good price or per-group of goods price, a quantity of goods requested by the buyer, and a total price for the delivery of the goods. In some cases, the account information of the buyer 104 and the account information of the supplier 112 are not sent to the delivery computing device 110 to maintain higher security over the account information.

Figure 5C:
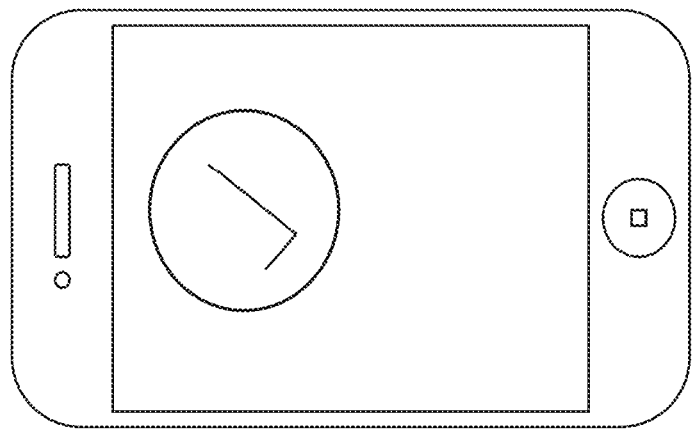
FIGS. 5A-5C depict various illustrative user interfaces provided by the software application installed on the mobile computing device in accordance with exemplary embodiments.
Figure 5B:
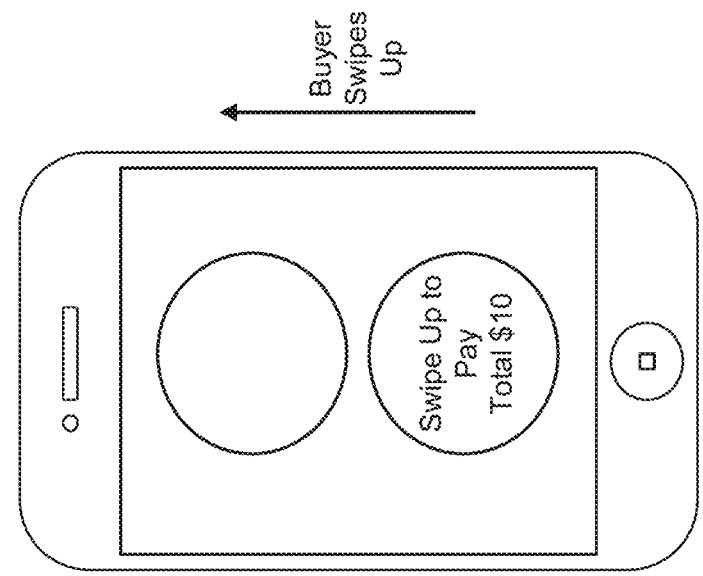
Figure 5A:
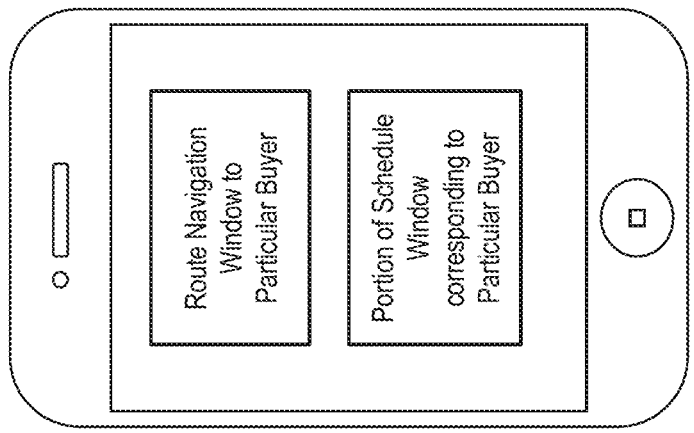

At step 404, the delivery computing device 110 may display, to the courier 108, the schedule and the route to the next buyer. In some cases, the route may be displayed on a first user interface and the schedule may be displayed on a different user interface. In such cases, the schedule may display multiple buyers and times goods are to be delivered to those buyers. In other cases, the route and a portion of the schedule may be displayed on the same single user interface as shown in FIG. 5A. In such cases, the user interface may include a first window to display route navigation to a particular buyer and a second window to display a portion of the schedule corresponding to the same particular buyer.

Once the courier 110 arrives at the location of the buyer 104, the delivery computing device 108 may, at step 406, display the invoice specific to the buyer 103 for viewing and acceptance by the buyer 104. At step 408, the delivery computing device 108 may determine whether the buyer 104 (or the courier 108 on behalf of the buyer 104) submitted an update to the goods being delivered. As an example, the buyer 104 may increase or decrease a particular quantity of goods being delivered. As another example, the buyer 104 may select a different type of good. If the buyer 102 submits an update, the process continues to step 410 in which the delivery computing device 110 generates an updated invoice. The updated invoice may be based on the adjustment in quantity or type of good selected for delivery by the buyer 104 in step 408 as well as the unit price (e.g., price per good, or group of goods for the selected type of good). As an example, if the buyer 104 adds 3 bottles of red wine for delivery where each bottles costs $10. The delivery mobile computing device 110 may update the invoice to add the 3 bottles of red wine for an additional amount of $30. The process may then return to step 406 and the updated invoice may be presented to the buyer 104. Once no more updates have been received (e.g., which may be determined by selection of a confirm icon on the user interface), the process proceeds to step 412 in which the delivery computing device 110 determines whether the buyer 104 has accepted the invoice. During display of the invoice, the delivery computing device 110 may also display an acceptance button that the buyer 104 may select to accept the invoice. If the buyer 104 has not selected the acceptance button, the delivery computing device 110 may continue display the invoice (or an updated invoice) until the buyer 104 accepts the invoice (or updated invoice). Once the buyer 104 accepts the invoice, the delivery mobile computing device 110 may, at step 414, receive buyer authentication information from the buyer 104. For instance, the buyer 104 may enter the buyer's authentication information, which may be in the form a biometric (e.g., fingerprint, facial-recognition, etc.). Additionally, the buyer 104 may enter a PIN or other password. The buyer's authentication information may be associated with the scheduled buyer for the location, which is already stored by the delivery computing device 110.

At step 416, the delivery computing device 110 may receive an indication of buyer confirmation for the total amount of the invoice (or updated invoice). Specifically, the delivery computing device 110 may display a user interface including two icons as depicted in FIG. 5B. The first icon may be any suitable shape (e.g., a circle is shown but others are contemplated). The first icon may be with or without indicia, and one a preselected color. The second icon may have a substantially similar shape and size as the first icon (e.g., a circle). The second icon may include a total amount of the invoice (e.g., $10 as depicted in FIG. 5B). The second icon may also include an instruction to align the two icons, or this could be otherwise provided if wanted. For instance, the second icon may include a statement "swipe up to pay." The buyer 104, in order to confirm payment, would touch the second icon and drag the second icon to substantially align with the first icon, or vice versa. Once completed, the second icon would disappear and the first icon would display a checkmark as shown in FIG. 5C or provide some other indication (e.g., audio, visual and/or tactile). With this graphics user interface (GUI) of one icon is swiped over a second bearing a data element and having substantially similar shape such the data element is covered or mostly covered by the data element that does not. This action shows acceptance of the invoice amount (or of other data element) by the user and may trigger a payment process with the invoice amount as explained herein. This GUI could be useful in showing acceptance of virtually any type of data and initiate a response to that acceptance. The icons could be of a variety of shapes and colors.

Once payment confirmation is complete, the delivery computing device 110 may, at step 418, generate invoice data and transmit the invoice data to the processing server 102 or the supplier ERP server 114 to forward to the processing server 102. The invoice data may include updated invoice (e.g., updated quantities, types, total pricing, etc.), the buyer's authentication information (e.g., biometric, PIN), an identifier of the buyer 104, an identifier of the supplier 112, an indication that the recipient moved a first icon to substantially align with a second icon to confirm payment, etc.

At step 420, the delivery computing device 110 may determine whether the courier 108 has reached the last stop by consulting the schedule. If there are additional buyers scheduled for delivery subsequent to the instant buyer, then the delivery computing device 110 may determine that the last stop has not been reached for the day and the process may return to step 404 in which an updated schedule and route to the next buyer may be displayed. Otherwise, if the courier 108 has reached the last stop, the process 400 may end.

In some cases, the courier 108 may, using a camera of the delivery computing device 110, take pictures or videos of goods being delivered to the buyer 104 to provide evidence of the delivery. In such cases, the invoice data may include the pictures or videos for storage by the processing server 102.

Real-Time Account-to-Account Payment

Figure 6:
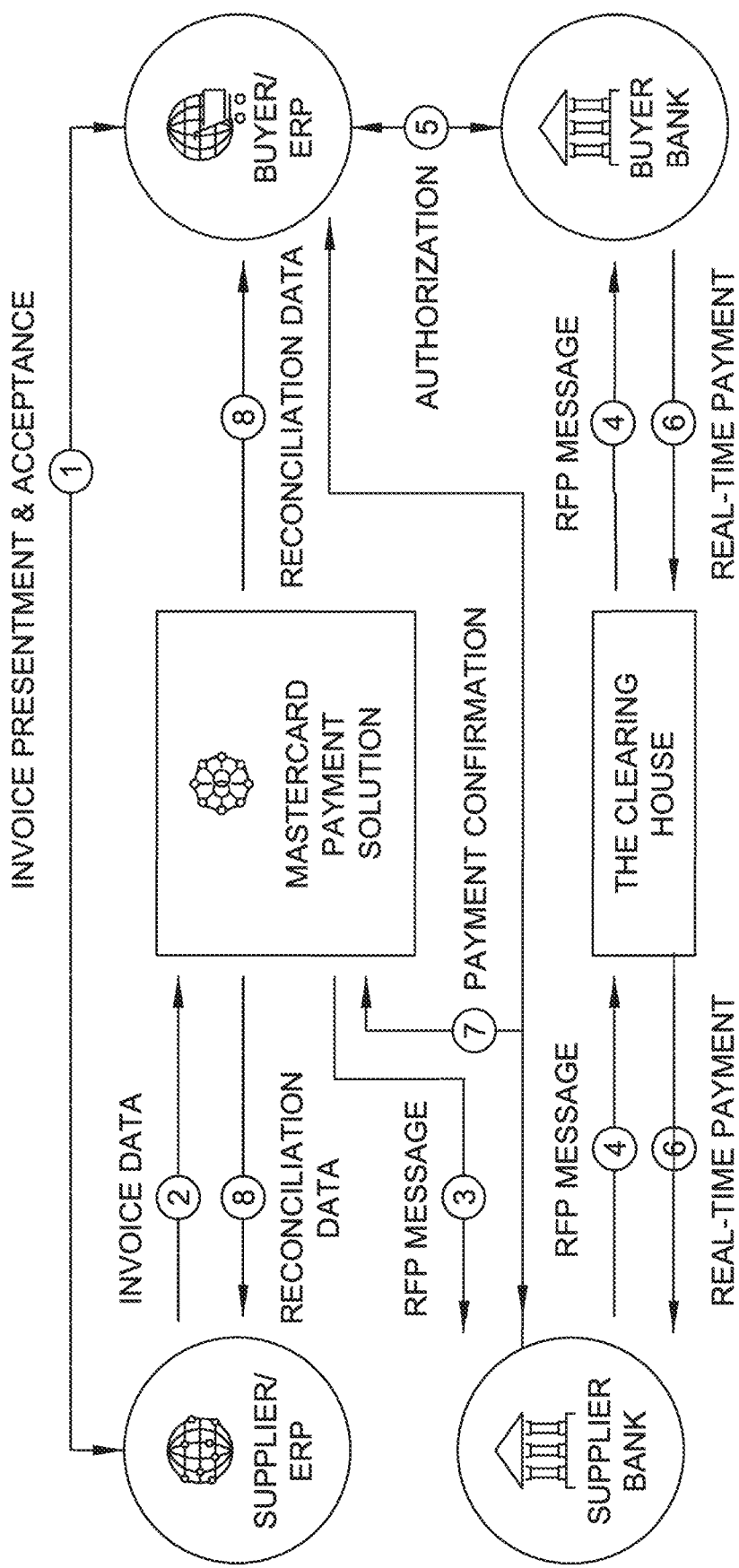
FIG. 6 is a message flow for increasing efficiency and permitting real-time account-to-account payments in delivery in accordance with exemplary embodiments.

FIG. 6 is a message flow for increasing efficiency and permitting real-time account-to-account payments in package delivery in accordance with exemplary embodiments.

At step 1, the delivery computing device 110 may perform invoice presentment and acceptance. For instance, the delivery computing device 110 may perform one or more of the steps of FIG. 4 discussed above. At step 2, if the invoice data has not already been received by the processing server 102, the supplier ERP server 114 may transmit the invoice data to the processing server 102. At step 3, the processing server 102 may generate and transmit an RFP message to the supplier bank server 116. The RFP message may be formatted in accordance with ISO 20022 and include account information of the buyer 104 and supplier 112 associated with the one or more data of the invoice data. The invoice data may be translated from an ERP format to the ISO 20222 format. An RFP message may include an account number of the buyer 104 for the buyer bank server 120, an account number of the supplier 112 for the supplier bank server 116, buyer authentication information (e.g., biometric, PIN, etc.) for use with the buyer bank server 120, an amount to transfer from the buyer's account to the supplier's account (e.g., the total invoice amount), etc. At step 4, the supplier ERP server 116 may transmit the RFP message to the buyer ERP server 120 via the clearing house server 118. At step 5, the buyer ERP server 120 may obtain authorization from the buyer ERP server 106 to transfer the payment from the buyer's account, which is identified using the buyer's account number. For instance, the buyer bank server 120 may transmit a request to the buyer ERP server 106 to debit the amount from the buyer's account. The request may include buyer authentication information (e.g., biometric, PIN) to authenticate the purchase by the buyer 104. If authentication is unsuccessful, authorization may be denied and the process may end. Otherwise, if authentication is successful, the buyer ERP server 106 may transmit a success message to the buyer bank server 120, which, in turn, causes the buyer bank server 120 to send, at step 6, real-time payment from the buyer's account to the supplier's account at the supplier bank server 116 via the clearing house server 116. Once the supplier's account has been credited the real-time payment, the supplier bank server 116 may, at step 7, generate and transmit a payment confirmation to the processing server 102. After receiving the payment confirmation, the processing server 102 may, at step 8, generate and transmit reconciliation data to the supplier ERP server 114 and the buyer ERP server 106. Reconciliation data may include transaction data for comparison by the ERP servers 114, 106.

Figure 7:
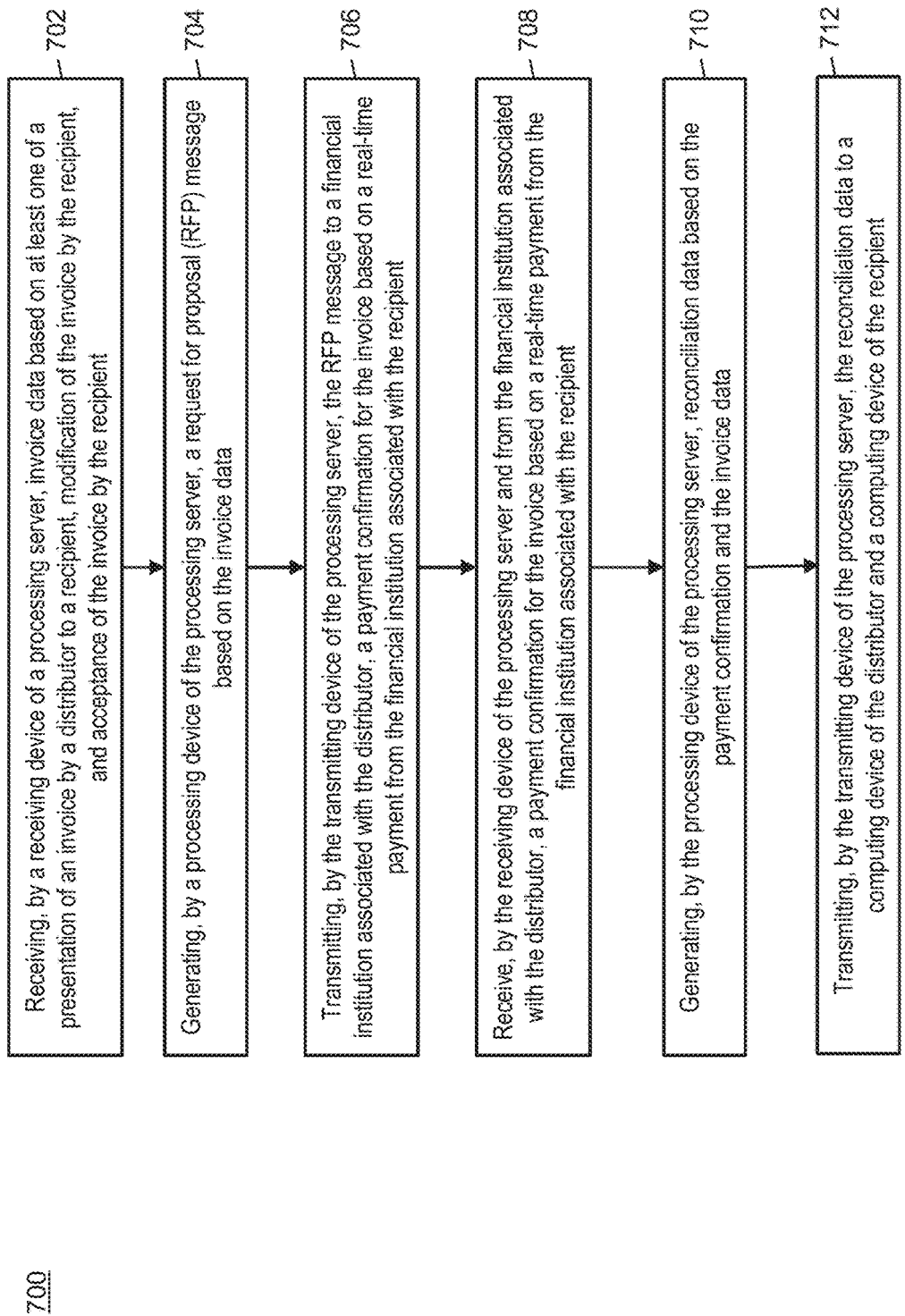
FIG. 7 is a flow chart illustrating an exemplary method for increasing efficiency and permitting real-time account-to-account payments in delivery in accordance with exemplary embodiments.

Exemplary Method for Real-Time Package Delivery Invoice Updating and Account-to-Account Payment FIG. 7 illustrates a method 700 for real-time package delivery invoice updating and account-to-account payment. Prior to starting method 700, a courier 108 of the distributor may have a delivery computing device 110 installed with a software application (e.g., a payment on delivery mobile app as described herein). The software application may be configured to perform one or more steps of FIG. 4. For instance, the software application may cause the delivery computing device 110 to present one or more user interfaces depicted in FIGS. 5A-5C. In some embodiments, one or more of the steps of FIG. 4 may be performed after one or more steps of method 700.

A supplier 112 may deliver goods to a buyer 104 (e.g., a merchant) through the use of a courier 108. The courier's delivery computing device 110 (e.g., tablet computer) may include a software application (e.g., mobile app) that may be dynamically updated by processing server 102 with scheduling, routing, and invoice information. The courier 108 may, via the delivery computing device 110, present the invoice to the buyer 104 for acceptance. Using the delivery computing device 110, the buyer 104 (or courier 108 on behalf of the buyer 104) may adjust the quantity and/or type of goods being purchased. The software application may dynamically update the invoice to account for the adjusted quantity and/or type of goods being purchased. The courier 108 may then present the updated invoice to the buyer 104 for acceptance. If the buyer 104 wishes to make further changes, the invoice may again be updated and presented to the buyer 104. Once the buyer 104 does not wish to make any further changes, the buyer 104 may, via the delivery computing device 110, accept delivery of the goods and the invoice. For instance, the buyer 104 may enter the buyer's authentication information (e.g., biometric, PIN) and align a first icon with a second icon as discussed herein. The software application may, based on the invoice, modifications to the invoice, and acceptance of the invoice, generate invoice data for the delivery computing device 110 to send to the processing server 102.

The method may begin at step 702 in which a receiving device of a processing server 102 may receive the invoice data. The invoice data may be based on presentation of an invoice by a courier 108 to a buyer 104 at a delivery location, modification of the invoice by the buyer 194, and acceptance of the invoice by the buyer 104. For example, the invoice data may be associated with a schedule of deliveries with the buyer 104 being one of the scheduled deliveries. Modifications to the invoice may include an adjustment of quantity (e.g., increasing or decreasing) and/or type of good. The invoice data may include a buyer authentication code for buyer payment authentication. Further, the invoice data may include an indication that the buyer moved a first icon to substantially align with a second icon. In some cases, the first and second icons have the same shape. In some cases, the first icon includes an indication of a total amount to pay for delivery of goods and an instruction to align the two icons.

In some cases and in order to provide evidence of the delivery to the buyer 104, the courier 108 may use the delivery computing device 110 to generate a picture or video of the goods being delivered to the buyer 104. In such cases, the invoice data may include the picture or video of the goods being delivered to the buyer 104.

At step 704, a processing device of the processing server 102 may generate a request for payment (RFP) message based on the invoice data. The RFP message may include an account number of the buyer 104 and the buyer authentication code for the financial institution associated with the buyer 104 from which to obtain the real-time payment. The RFP message may also include an account number of the supplier 112 for the financial institution associated with the supplier 112 to credit the real-time payment. The RFP message may also include an amount to debit from the buyer's account to credit to the supplier's account. At step 706, a transmitting device of the processing server 102 may transmit the RFP message to a financial institution associated with the buyer 104 via a financial institution of the supplier 112.

At step 708, the receiving device of the processing server 102 may receive, from the financial institution associated with the supplier 112, a payment confirmation for the invoice based on a real-time payment from the financial institution associated with the buyer 104.

At step 710, the processing device of the processing server 102 may generate reconciliation data based on the payment confirmation and the invoice data. At step 712, the transmitting device of the processing server 102 may transmit the reconciliation data to a computing device of the supplier 112 and a computing device of the buyer 104.

Computer System Architecture

FIG. 8 illustrates a computer system 800 in which embodiments of the present disclosure, or portions thereof, may be implemented as computer-readable code. For example, the processing server 102 of FIG. 1 may be implemented in the computer system 800 using hardware, software, firmware, non-transitory computer readable media having instructions stored thereon, or a combination thereof and may be implemented in one or more computer systems or other processing systems.

Hardware, software, or any combination thereof may embody modules and components used to implement the methods of FIGS. 4, 6, and 7.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 818, a removable storage unit 822, and a hard disk installed in hard disk drive 812.

Various embodiments of the present disclosure are described in terms of this example computer system 800. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 804 may be a special purpose or a general purpose processor device specifically configured to perform the functions discussed herein. The processor device 804 may be connected to a communications infrastructure 806, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 800 may also include a main memory 808 (e.g., random access memory, read-only memory, etc.), and may also include a secondary memory 810. The secondary memory 810 may include the hard disk drive 812 and a removable storage drive 814, such as a floppy disk drive, a magnetic tape drive, an optical disk drive, a flash memory, etc.

The removable storage drive 814 may read from and/or write to the removable storage unit 818 in a well-known manner. The removable storage unit 818 may include a removable storage media that may be read by and written to by the removable storage drive 814. For example, if the removable storage drive 814 is a floppy disk drive or universal serial bus port, the removable storage unit 818 may be a floppy disk or portable flash drive, respectively. In one embodiment, the removable storage unit 818 may be non-transitory computer readable recording media.

In some embodiments, the secondary memory 810 may include alternative means for allowing computer programs or other instructions to be loaded into the computer system 800, for example, the removable storage unit 822 and an interface 820. Examples of such means may include a program cartridge and cartridge interface (e.g., as found in video game systems), a removable memory chip (e.g., EEPROM, PROM, etc.) and associated socket, and other removable storage units 822 and interfaces 820 as will be apparent to persons having skill in the relevant art.

Data stored in the computer system 800 (e.g., in the main memory 808 and/or the secondary memory 810) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 800 may also include a communications interface 824. The communications interface 824 may be configured to allow software and data to be transferred between the computer system 800 and external devices. Exemplary communications interfaces 824 may include a modem, a network interface (e.g., an Ethernet card), a communications port, a PCMCIA slot and card, etc. Software and data transferred via the communications interface 824 may be in the form of signals, which may be electronic, electromagnetic, optical, or other signals as will be apparent to persons having skill in the relevant art. The signals may travel via a communications path 826, which may be configured to carry the signals and may be implemented using wire, cable, fiber optics, a phone line, a cellular phone link, a radio frequency link, etc.

The computer system 800 may further include a display interface 802. The display interface 802 may be configured to allow data to be transferred between the computer system 800 and external display 830. Exemplary display interfaces 802 may include high-definition multimedia interface (HDMI), digital visual interface (DVI), video graphics array (VGA), etc. The display 830 may be any suitable type of display for displaying data transmitted via the display interface 802 of the computer system 800, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 808 and secondary memory 810, which may be memory semiconductors (e.g., DRAMs, etc.). These computer program products may be means for providing software to the computer system 800. Computer programs (e.g., computer control logic) may be stored in the main memory 808 and/or the secondary memory 810. Computer programs may also be received via the communications interface 824. Such computer programs, when executed, may enable computer system 800 to implement the present methods as discussed herein. In particular, the computer programs, when executed, may enable processor device 804 to implement the methods illustrated by FIGS. 4, 6, and 7, as discussed herein. Accordingly, such computer programs may represent controllers of the computer system 800. Where the present disclosure is implemented using software, the software may be stored in a computer program product and loaded into the computer system 800 using the removable storage drive 814, interface 820, and hard disk drive 812, or communications interface 824.

The processor device 804 may comprise one or more modules or engines configured to perform the functions of the computer system 800. Each of the modules or engines may be implemented using hardware and, in some instances, may also utilize software, such as corresponding to program code and/or programs stored in the main memory 808 or secondary memory 810. In such instances, program code may be compiled by the processor device 804 (e.g., by a compiling module or engine) prior to execution by the hardware of the computer system 800. For example, the program code may be source code written in a programming language that is translated into a lower level language, such as assembly language or machine code, for execution by the processor device 804 and/or any additional hardware components of the computer system 800. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 800 to perform the functions disclosed herein. It will be apparent to persons having skill in the relevant art that such processes result in the computer system 800 being a specially configured computer system 800 uniquely programmed to perform the functions discussed above.

Process for Real-Time Sales Order Updating

Figure 9:
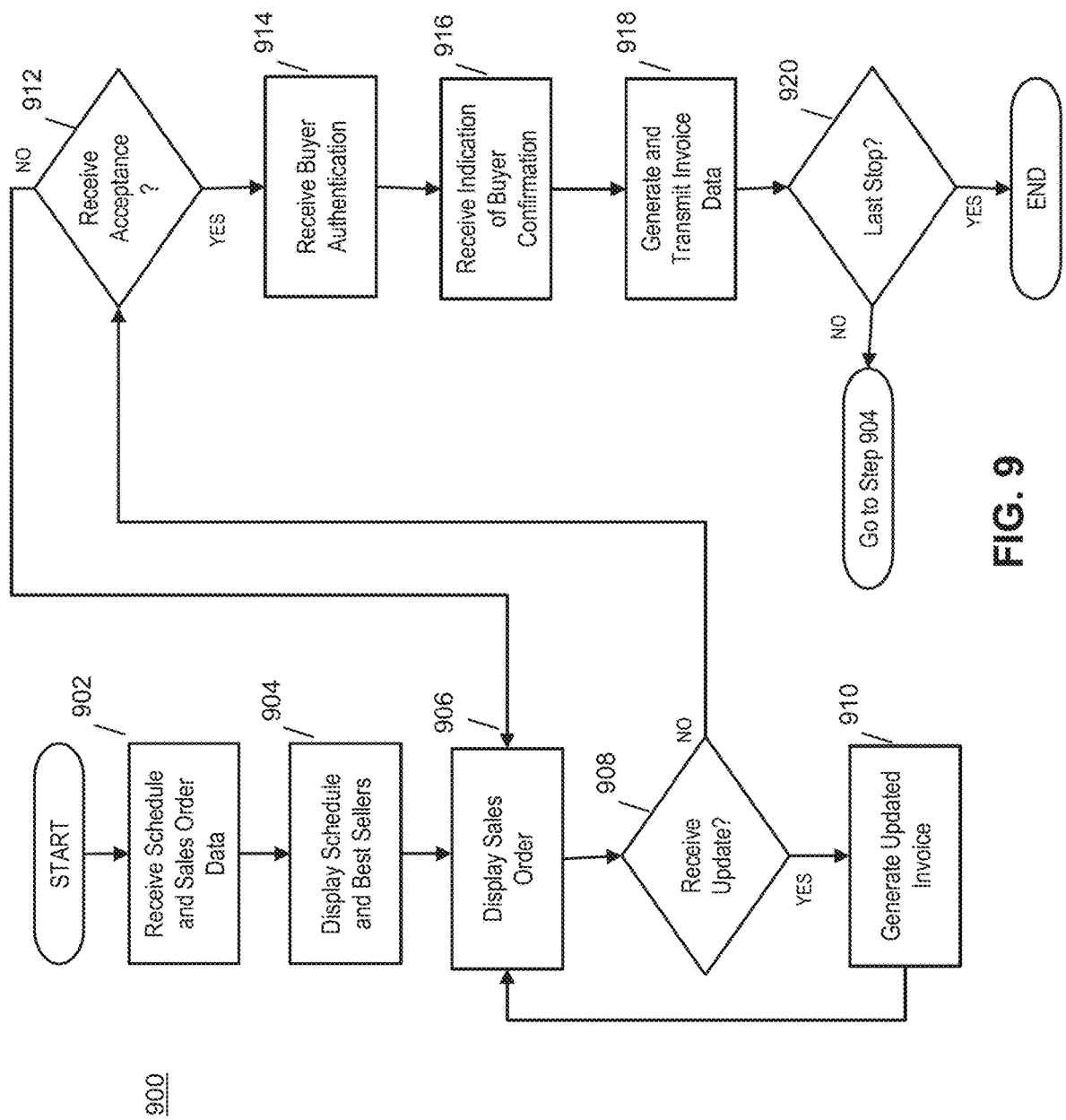
FIG. 9 is a flow diagram illustrating a process for permitting real-time account-to-account payments using a software application installed on a mobile computing device in accordance with exemplary embodiments.

FIG. 9 illustrates a process 900 executed by the sales computing device of the system 100 for real-time sales order updating and account-to-account payment. Prior to starting process 900, the sales person of the distributor may obtain the sales computing device executing a software application (e.g., a payment on delivery mobile app as described herein) installed thereon. The software application may be configured to perform one or more steps of discussed herein (e.g., FIG. 4, FIG. 9, etc.). For instance, the software application may cause the sales computing device to present one or more user interfaces depicted in FIGS. 10A-10B as will be described in detail below.

A supplier 112 may wish to obtain a sales order from a buyer 104 through the use of a sales person. At step 902, the sales computing device (e.g., tablet computer) may include a POD software application (e.g., mobile app) that may receive, from processing server 102, a schedule of appointments of the sales person to meet with various buyers 104, best seller information, sales history, buyer order details, invoice details, financing options, buyer's current balance and available credit, and any information displayed in a user interface (e.g., FIGS. 10A-10B). The scheduling information may include a schedule of a list of appointments with buyers 104 and times to meet with each of those buyers 104. The schedule information may also include an address and contact information of each of the buyers 104. The buyer order details may include a separate sales order for each buyer 104. The sales order for a particular buyer may include, for example, an itemized list of goods to be delivered, a per-good price or per-group of goods price, a quantity of goods requested by the buyer, and a total price for the delivery of the goods. In some cases, the account information of the buyer 104 and the account information of the supplier 112 are not sent to the sales computing device to maintain higher security over the account information.

Figure 10B:
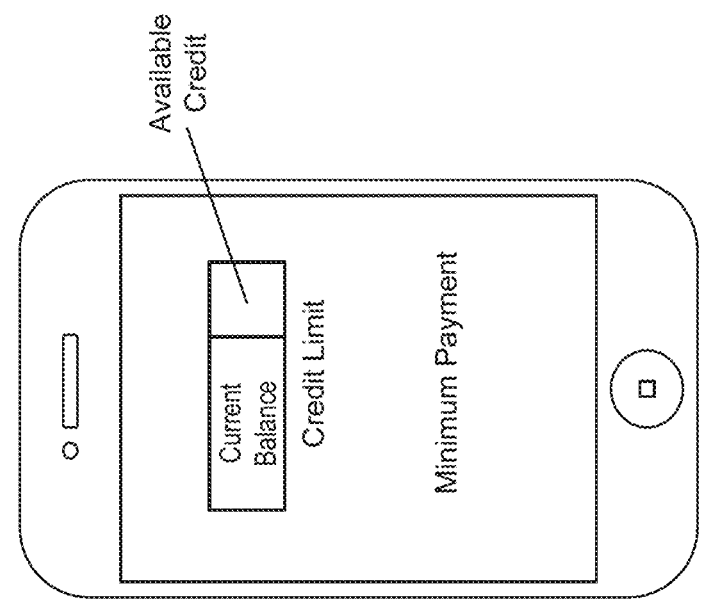
FIGS. 10A-10B depict various illustrative user interfaces provided by the software application installed on the mobile computing device in accordance with exemplary embodiments.
Figure 10A:
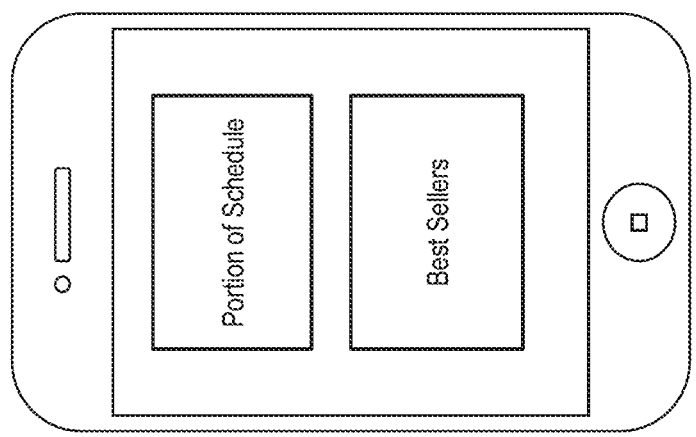

At step 904, the sales computing device may display, to the sales person, the schedule of appointments with various buyers 104 in a user interface such as, for example, the user interface depicted in FIG. 10A. The user interface may include at least a portion of the sales person's schedule of appointments as well as a dynamically updated best sellers list. The schedule may be set previously by the sales person and/or the supplier 112. The schedule may account for the buyer's availability and the amount of time for the sales person to travel to the buyer's location.

The best sellers list may inform the sales person of products each particular buyer 104 may wish to purchase or are likely to purchase. The best sellers list may be tailored to the particular buyer 104 the sales person is currently scheduled to meet or is next in the list of appointments. Similarly stated, the best sellers list changes for each buyer 104. The best sellers list may be determined by the processing server 102 prior to sending the best sellers information to the sales computing device. In order to determine the best sellers list for a particular buyer 104, the processing server 102 may determine best matches for each particular buyer 104 based on the purchase history of the buyer 104 (e.g., products, product types the buyer has purchased), special sales, promotions, sales history of the product among a group of customers over a predetermined time period (e.g., top ten selling beverages over the past month), and the like. The best sellers list may include a "view more" user-selectable button that permits the sales person to filter down by category of products, sales volume, promotions, and the like.

The sales person may select an appointment with a particular buyer 104 to display more information about the buyer 104. For example, the information may include one or more of the name and address of the buyer 104, the current balance of the buyer 104, an available credit of the buyer 104, a credit limit of the buyer 104, a graph of the sales history of the buyer 104, and past transactions of the buyer 104. In some cases, a graphical indication of the current balance of the buyer 104 relative to the buyer's credit limit may be displayed. For example, a graphical bar may represent the credit limit for the buyer 104, which may be at least partially filled based the current balance of the buyer 104. As a result, the sales person can quickly gauge from the graphical bar the remaining available credit by inspecting the amount of the bar that is not filled. Thus, the sales person can caution the buyer about the buyer's available credit and consequences of exceeding the buyer's credit limit. In some cases, the graph of the sales history of buyer may include a graph for each product type (and/or product) superimposed onto one another. The buyer's past transactions (e.g., orders) may include an order number, date of order, and transaction amount. Each of the past transactions may be hyperlinked to view an itemized list of the transaction.

At step 906, once the sales persons meets with the buyer 104, the sales person may select a new order or an existing order to display to the buyer. The displayed order may be specific to the buyer. The buyer may accept the order and/or have the sales person update the order. Specifically, the sales computing device may, at step 908, determine whether an update to the sales order for the buyer has been received (e.g., by monitoring user input to the sales computing device). The sales computing devices may provide menus and lists to select items for purchase. The menus and lists may be prioritized based on prior orders. If an update is received, the sales computing device, at step 910, updates the sales order to reflect changes input by the sale person or buyer and returns to step 906. Otherwise, if no update has been received, the sales computing device may, at step 912, determine whether an acceptance of the sales order has been received. If not, the process returns to step 906. Otherwise, if the buyer 104 has accepted the sales order, the sales computing device may, at step 914, receive buyer authentication information from the buyer 104. For instance, the buyer 104 may enter the buyer's authentication information, which may be in the form a biometric (e.g., fingerprint, facial-recognition, etc.). Additionally, the buyer 104 may enter a PIN or other password.

In some embodiments, after buyer 104 accepts the sales order and prior to authentication of the buyer, the sales computing device may present a user interface displaying multiple financing options for the buyer 104 to pay for the sales order. The user interface may display the current balance, various financing options (e.g., 30 days with no fee, 60 days with a 2% fee on the sales total, 90 days with a 4% fee on the sales total, etc.).

In some embodiments, the sales computing device may also display a user interface as depicted in FIG. 10B. For example, a graphical bar may represent the credit limit for the buyer 104, which may be at least partially filled based the current balance of the buyer 104. The user interface may also display a minimum payment, which may be determined by the sale computing device based on the payment rule that the minimum payment must be lower than the buyer's available credit (e.g., a difference between the buyer's credit limit and buyer's current balance).

At step 916, the sales computing device may receive an indication of buyer acceptance for the total amount of the sales order (or updated sales order). Specifically, the sales computing device may display a user interface including two icons as depicted in FIG. 5B. The first icon may be any suitable shape (e.g., a circle is shown but others are contemplated). The first icon may be with or without indicia, and a preselected color. The second icon may have a substantially similar shape and size as the first icon (e.g., a circle). The second icon may include a total amount of the sales order (e.g., $10 as depicted in FIG. 5B). The second icon may also include an instruction to align the two icons, or this could be otherwise provided if wanted. For instance, the second icon may include a statement "swipe up to pay." The buyer 104, in order to confirm payment, would touch the second icon and drag the second icon to substantially align with the first icon, or vice versa. Once completed, the second icon would disappear and the first icon would display a checkmark as shown in FIG. 5C or provide some other indication (e.g., audio, visual and/or tactile). With this graphics user interface (GUI) of one icon is swiped over a second bearing a data element and having substantially similar shape such the data element is covered or mostly covered by the data element that does not. This action shows acceptance of the sales order (or of other data element) by the buyer 104 and may trigger a payment process with the sales order amount as explained herein in connection with FIG. 6. This GUI could be useful in showing acceptance of virtually any type of data and initiate a response to that acceptance. The icons could be of a variety of shapes and colors.

Once payment confirmation is complete, the sales computing device may, at step 918, generate invoice data and transmit the invoice data to the processing server 102 or the supplier ERP server 114 to forward to the processing server 102. The invoice data may include updated sales order (e.g., updated quantities, types, total pricing, etc.), the buyer's authentication information (e.g., biometric, PIN), an identifier of the buyer 104, an identifier of the supplier 112, an indication that the recipient moved a first icon to substantially align with a second icon to confirm payment, etc. The invoice data may also include any selected financing options and the determined minimum payment. At this point, the flow of FIG. 6 may begin to process the payment.

At step 920, the sales computing device may determine whether the sales person has reached the last stop by consulting the schedule. If there are additional buyers scheduled for an appointment, then the sales computing device may determine that the last stop has not been reached for the day and the process may return to step 904 in which an updated schedule and route to the next buyer may be displayed. Otherwise, if the sales person has reached the last stop, the process 900 may end.

Exemplary Methods of Payment for a Sales Order

Figure 11:
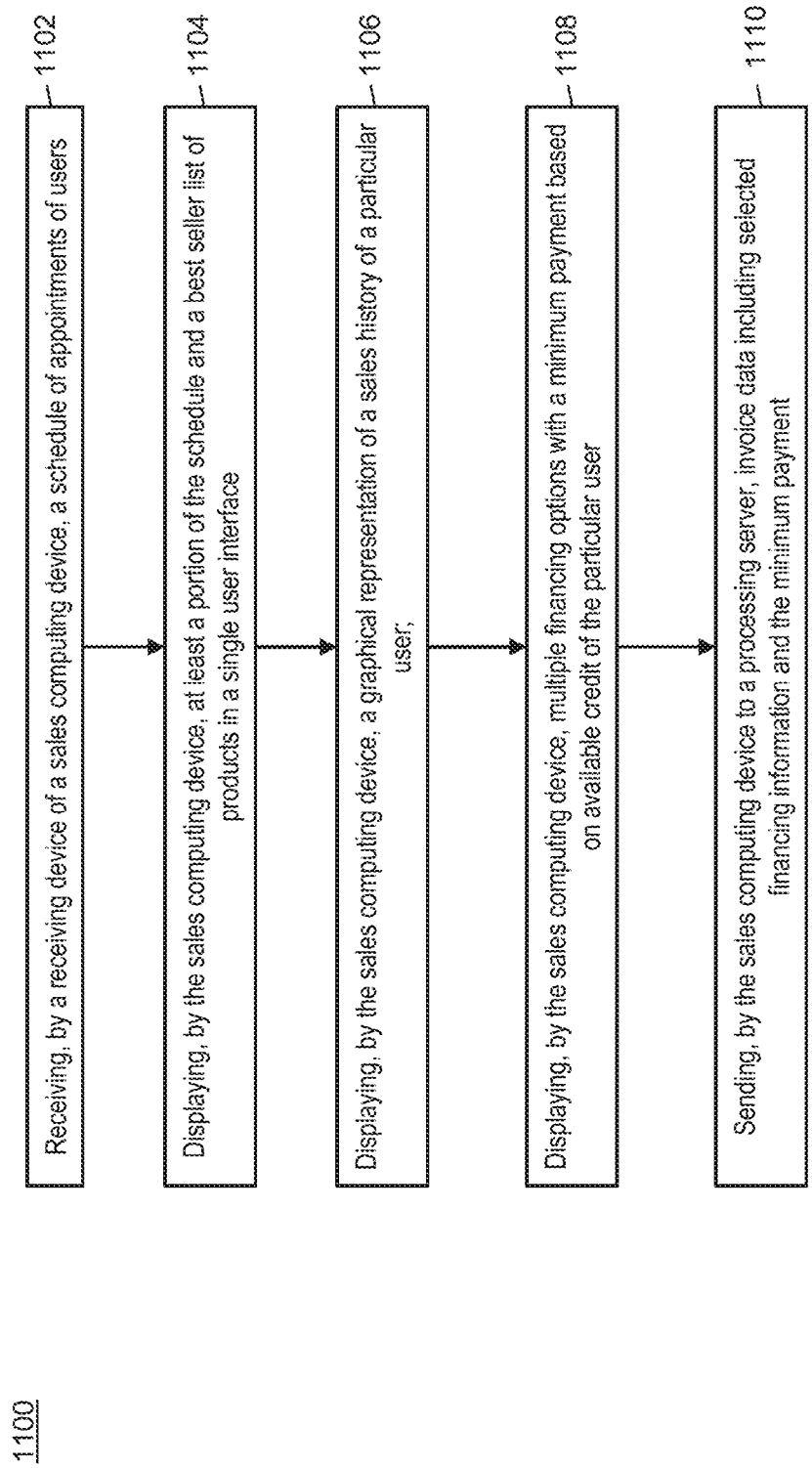
FIG. 11 is a flow chart illustrating an exemplary method for permitting real-time sales order updating in accordance with exemplary embodiments.

A method 1100, depicted in FIG. 11, for real-time sales order updating and account-to-account payment includes one or more of the following steps. At step 1102, a receiving device of a sales computing device receives a schedule of appointments with users. At step 1104, the sales computing device displays at least a portion of the schedule and a best seller list of products in a single user interface. At step 1106, the sales computing device displays a graphical representation of a sales history of a particular user. At step 1108, the sales computing device also displays multiple financing options with a minimum payment based on an available credit of the particular user. At step 1110, the sales computing devices sends, to a processing server, invoice data including selected financing information and the minimum payment.

System Architecture

Figure 12:
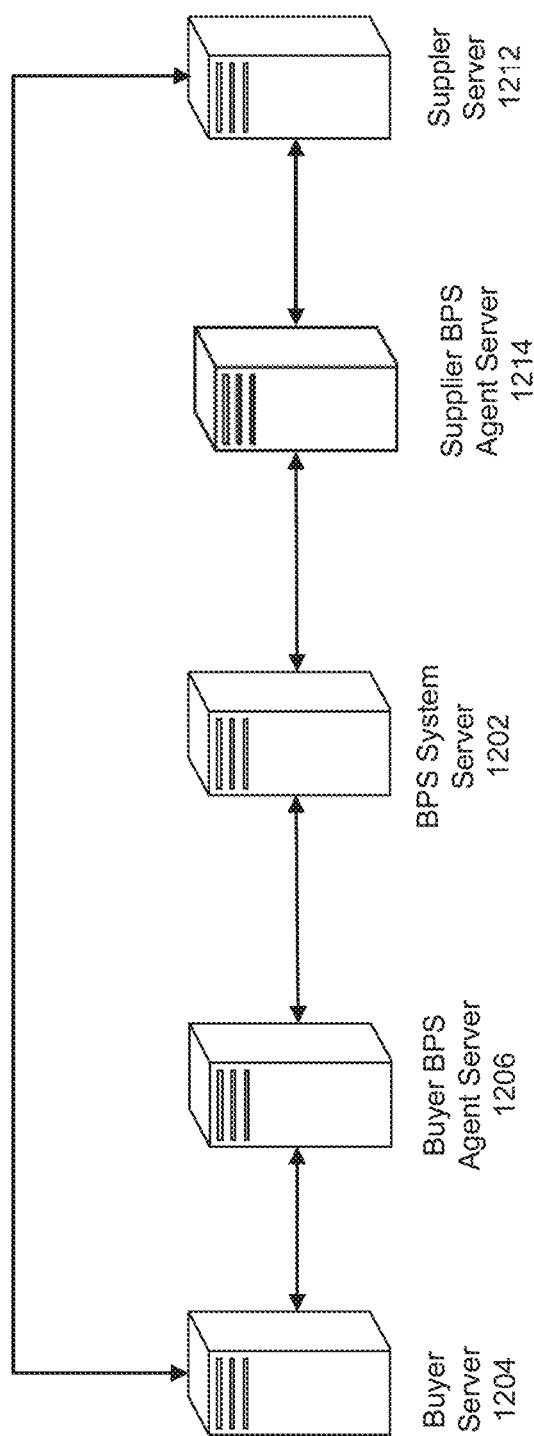
FIG. 12 is a block diagram illustrating a high-level system architecture in accordance with exemplary embodiments.

A system 1200, depicted in FIG. 12, may include a business payment service (BPS) system server 1202, a buyer server 1204, a buyer BPS agent server 1206, a supplier server 1212, and a supplier BPS agent server 1214. In one or more arrangements, the BPS system server 1202 may be the POD provider server 102, the buyer BPS agent server 1206 may be the buyer ERP server 106, the supplier BPS agent server 1214 may be the suppler ERP server 114. Each of the servers 1202-1214 may be embodied as a computing device as described in FIG. 8 and communicate with one another via one or more wired and/or wireless networks (e.g., the Internet, wide area network, and/or local area network).

BPS system server 1202 may be responsible for tracking and facilitating account-to-account transaction between buyers and suppliers. The BPS system server 1202 may include databases that store registration information of a buyer (e.g., buyer name, buyer address, buyer tax identifier, buyer identifier) as well as buyer payment request information (e.g., buyer identifier, supplier payment identifier, virtual card network (VCN), expiration date of credit card or other account, card verification value (CVV2), payment amount, currency, invoice number, customer reference number, invoice amount, invoice date, adjustment amount, adjustment reasons, etc.). The BPS system server 1202 may include databases that store registration information of a supplier (e.g., supplier name, supplier address, tax identifier, payment identifier, and acceptance terms).

Prior to payment, the buyer server 1204 may register for the BPS service. For instance, the buyer server 1204 may transmit a sign up request to buyer BPS agent server 1206. The request may include one or more of the buyer name, buyer address, buyer tax identifier, buyer identifiers, etc. The buyer BPS agent server 1206 may then forward the request to the BPS system server 1202. The BPS system server 1202 may store contents of the request in a database and transmit, to the buyer BPS server 1206, a confirmation of the registration of the buyer and the buyer identifier.

Similarly, prior to payment, the supplier server 1212 may register for the BPS service. For instance, the supplier server 1212 may transmit a sign-up request to supplier BPS agent server 1214. The request may include one or more of the supplier name, supplier address, supplier tax identifier, supplier payment identifiers, acceptance terms, etc. The supplier BPS agent server 1214 may then forward the request to the BPS system server 1202. The BPS system server 1202 may store contents of the request in a database and transmit, to the supplier BPS server 1214, a confirmation of the registration of the supplier and the supplier payment identifier.

Prior to payment, the buyer server 1204 and the supplier server 1212 may establish a business relationship including payment terms. Additionally, the buyer server 1204 and the supplier server 1212 may communicate their respective BPS payment identifier to one another. For instance, the BPS payment identifiers may be included in invoices or transmitted via other channels.

Once the buyer server 1204 receives one or more invoices from supplier server 1212, the buyer may determine whether the buyer approves of the invoices and, if so, the buyer server 1204 may transmit approved invoices to the buyer BPS agent server 1206. The buyer BPS agent server 1206 may be configured to, upon receiving the invoices, periodically (e.g., each hour or fraction of hour, day, week, month, etc.) or upon activation transmit invoice payment statutes to the buyer server 1204. For instance, the payment status may be one of invoice payment is complete or invoice payment is pending. The BPS agent server 1206 may also generate, based on the invoices and the buyer's registration information, a payment request message. The payment request message may include payment request information, which as discussed above, includes a buyer identifier, a supplier payment identifier, a VCN, an expiration date of credit card or other account, a CVV2, a payment amount, a currency, an invoice number, a customer reference number, an invoice amount, an invoice date, an adjustment amount, an adjustment reasons, etc.

In response to receiving the payment request message, the BPS system server 1202 may, based on the payment request message and stored registration information of the buyer and the supplier, modify the payment request message to also include the buyer name, buyer address, and buyer tax identifier. The BPS system server 1202 may transmit the modified payment request message to the supplier BPS agent server 1214. The supplier BPS agent server may process the payment request message and generate reconciliation data that it transmit to the supplier server 1212. Additionally, supplier BPS agent server 1214 may determine, based on the payment request message and the acceptance terms (e.g., accept all credit cards, accept only certain credit cards, accepts credit card only if amount is greater than a minimum amount, etc.), whether to approve or decline the transaction. The supplier BPS agent server 1214 may then generate a payment request response including an indication that the payment request was received, an indication that the payment request was submitted/analyzed, and an indication whether the payment request was approved or denied. If approved, the payment request response message may also include an authorization code. If declined, the payment request response message may also include a reason the payment request was declined (e.g., identify one or more acceptance terms that were not met).

The supplier BPS agent server 1214 transmit the payment request response message to the BPS system server 1202, which stores the content of the message in its databases as well as forwards the payment request response message to the buyer BPS agent server 1206.

Message Flows

Figure 13:
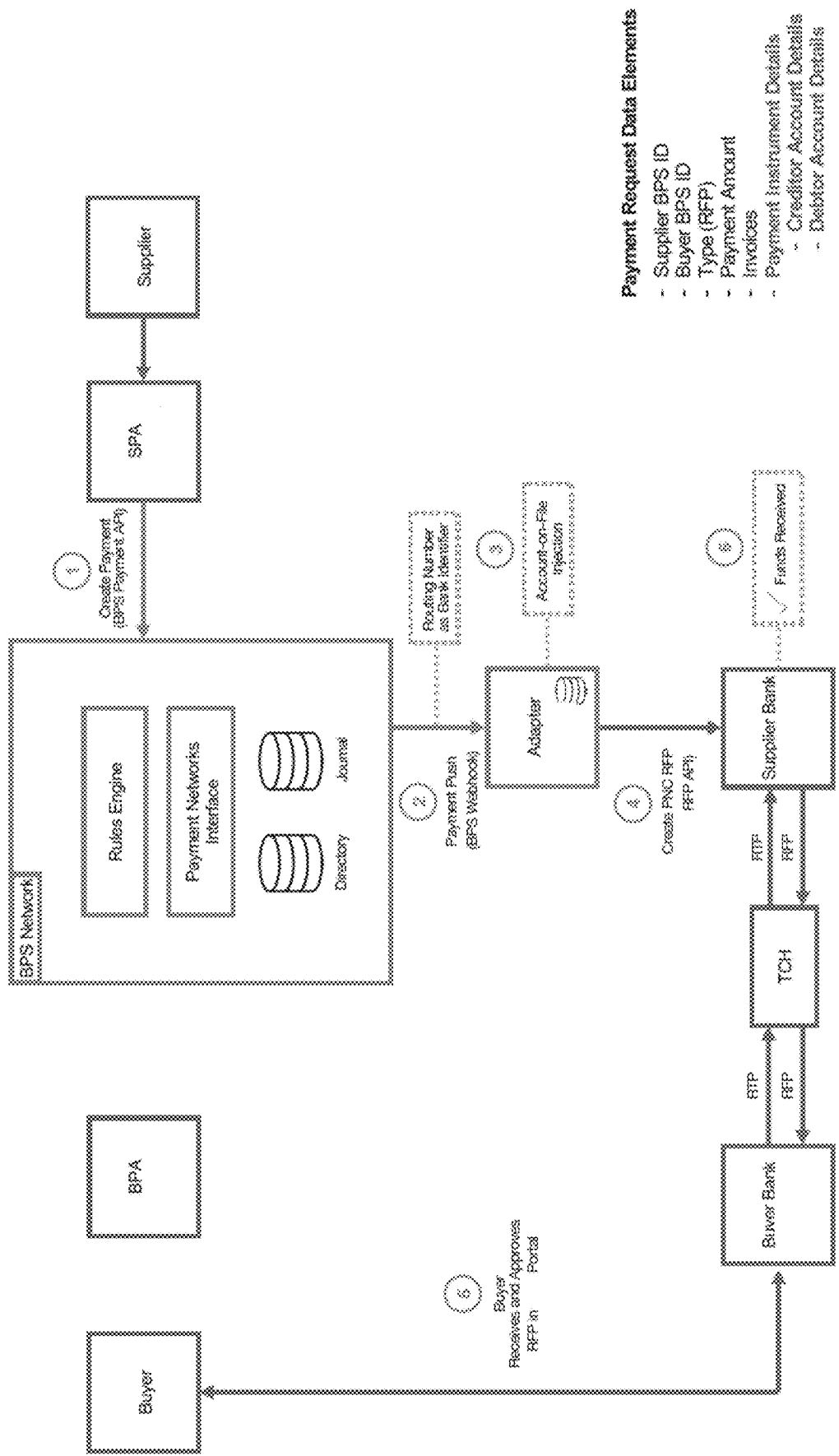
FIGS. 13-21 are message flows in accordance with exemplary embodiments.

FIG. 13 depicts a message flow for initiating a payment in accordance with exemplary embodiments. At step 1, the supplier BPS agent (SPA) (e.g., supplier BPS agent server 1214) may generate a payment request and transmit the payment request to the BPS network (e.g., BPS system server 1202). The payment request may be transmitted via a BPS payment API that interfaces the BPS network with the SPA. The payment request may include a supplier BPS identifier, a buyer BPS identifier, a type (RFP), a payment amount, invoices, and payment instrument details (e.g., creditor account number, creditor account name, debtor account number, debtor account name, etc.). At step 2, the BPS network forms a payment push message that includes a routing number (i.e., bank identifier) of the supplier's bank. The BPS network sends the payment push message to an adapter. At step 3, the adapter may, using account-to-file injection, translate the payment push message from a format specific to the BPS network to a different format specific to the supplier's bank. The translated payment push message may be referred to herein as a request for proposal (RFP). At step 4, the adapter may transmit, via the supplier's bank API, the RFP to the supplier's bank based on the routing number. The supplier's bank may transmit the RFP to the buyer's bank using a clearing house (e.g., The Clearing House (TCH)). At step 5, the buyer's bank sends the buyer (e.g., buyer server 1204) the RFP and, in response, receives an approval of the RFP from the buyer. Once approved, the buyer's bank may, based on the payment amount in the RFP, debit the buyer's account and provide a real-time payment (RTP) to the supplier bank using the clearing house. The supplier's bank may store the real-time payment in the supplier's account. At step 6, the supplier's bank notifies the supplier that the payment (funds) have been received as will be explained in additional detail in FIG. 14.

Figure 14:
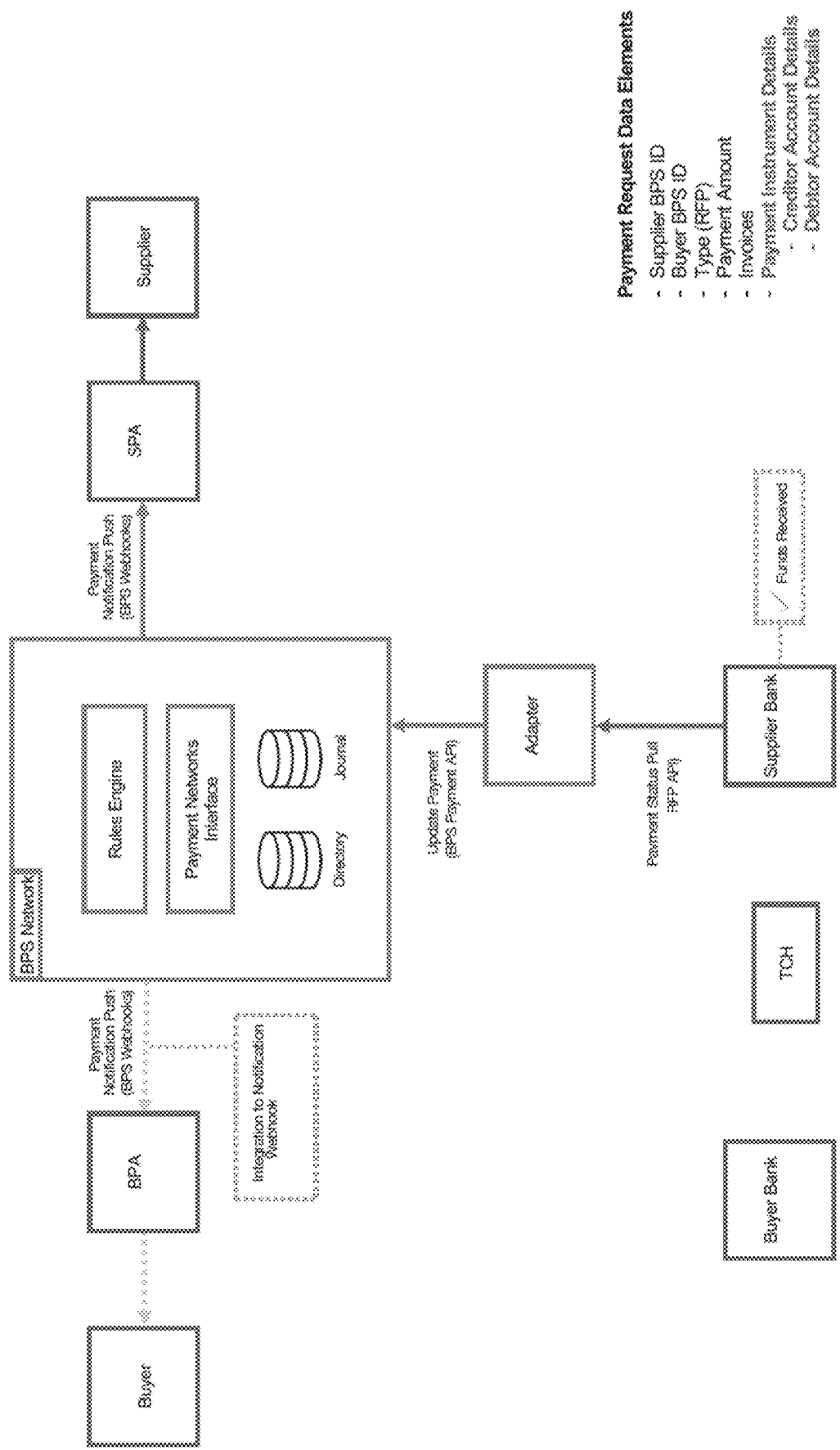

FIG. 14 depicts a message flow for a payment notification in accordance with exemplary embodiments. Once funds are received, the supplier's bank generates a payment status pull message that includes an indication that the funds have been received and sends the message to the adapter via a supplier bank API. The adapter then translates to the message from a format specific to the supplier's bank to a format specific to the BPS network and sends the translated message to the BPS network. In response to receiving the funds received notification, the BPS network notifies the supplier payment agent (SPA) which, in turn, notifies the supplier. The BPS network also notifies the BPA, which, in turn, notifies the buyer. The SPA supports supplier-side integration and/or data services for enterprise resource planning (ERP), buyer payments service (BPS), and/or payment on delivery (POD).

Figure 15:
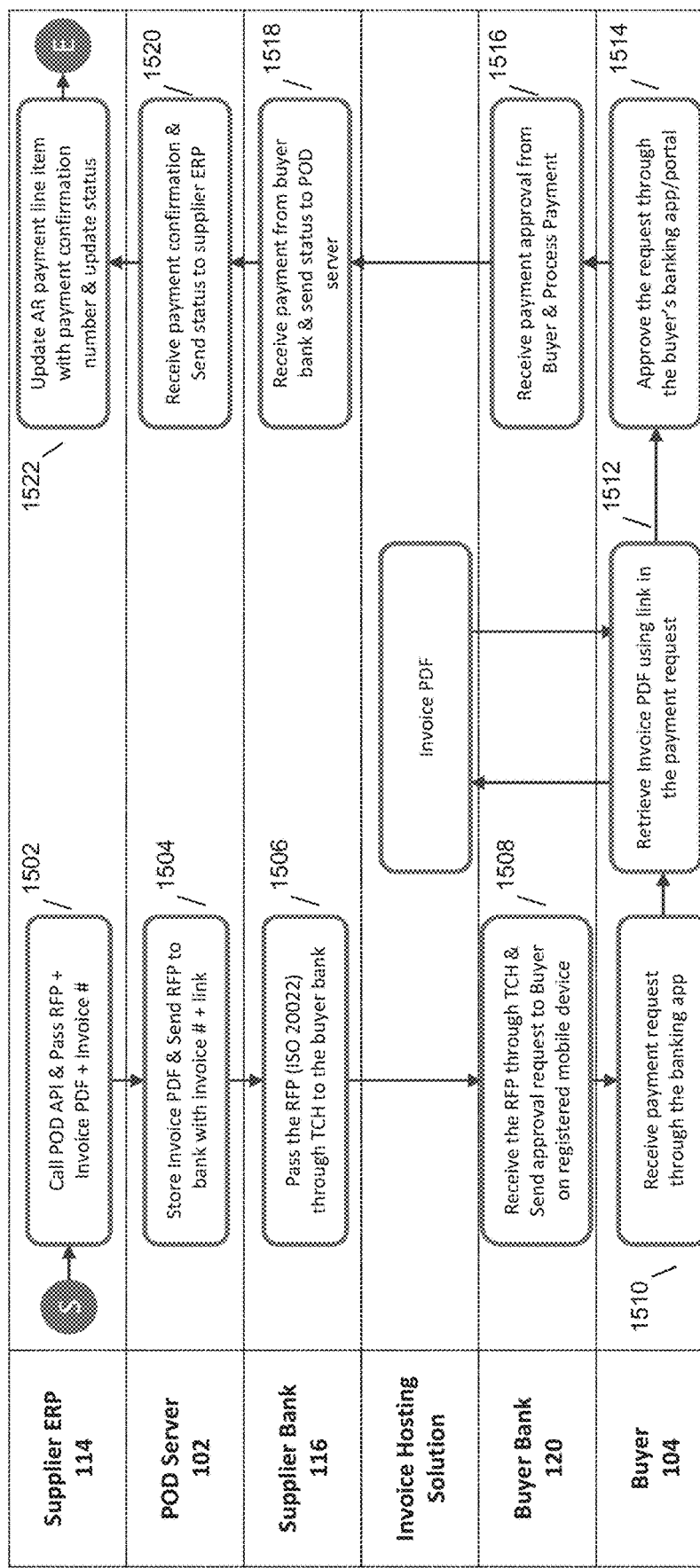

FIG. 15 depicts a message flow for real-time payment in accordance with illustrative embodiments. At step 1502, the supplier ERP server 114 issues a call to the POD server 102 using an application programming interface (API). The call may include invoice data (e.g., invoice PDF) associated with a buyer and a supplier, and an invoice number. At step 1504, the POD server 102 stores the invoice data and sends a request for payment (RFP) to the supplier's bank server 116. The RFP may include a link to retrieve the invoice data and any other information associated with the buyer or supplier as discussed herein. At step 1506, the supplier bank server 116 passes the RFP through the clearing house server 118 to the buyer's bank server 120. At step 1508, the buyer bank server 120 receives the RFP via the clearing house server 118 and sends an approval request to buyer 104 on a registered computing device (e.g., mobile device) of the buyer 104. At step 1510, the buyer 104, via a banking app installed on its registered computing device, receives the payment request. At step 1512, the buyer, via its registered computing device, retrieves invoice data using the link to retrieve the invoice data. The invoice data may be retrieved from an invoice hosting solution and/or the POD server 102. At step 1514, the buyer 104 may approve the request on its computing device via either the banking app installed thereon or a web portal. At step 1516, the buyer bank server 120 receives payment approval from the buyer 104 and then transmits funds from the buyer's account to the supplier bank server 116. At step 1518, the supplier bank server 116 receives the buyer's payment from buyer bank server 120 and sends a status message indicated received funds to the POD server 102. At step 1520, the POD server 102 receives the payment confirmation and then forwards status to supplier ERP server 114. At step 1522, the supplier ERP server 114 updates accounts receivable payment line item with payment confirmation number and update status. The BPA supports buyer-side integration and/or data services for enterprise resource planning (ERP), buyer payments service (BPS), and/or payment on delivery (POD).

Figure 16:
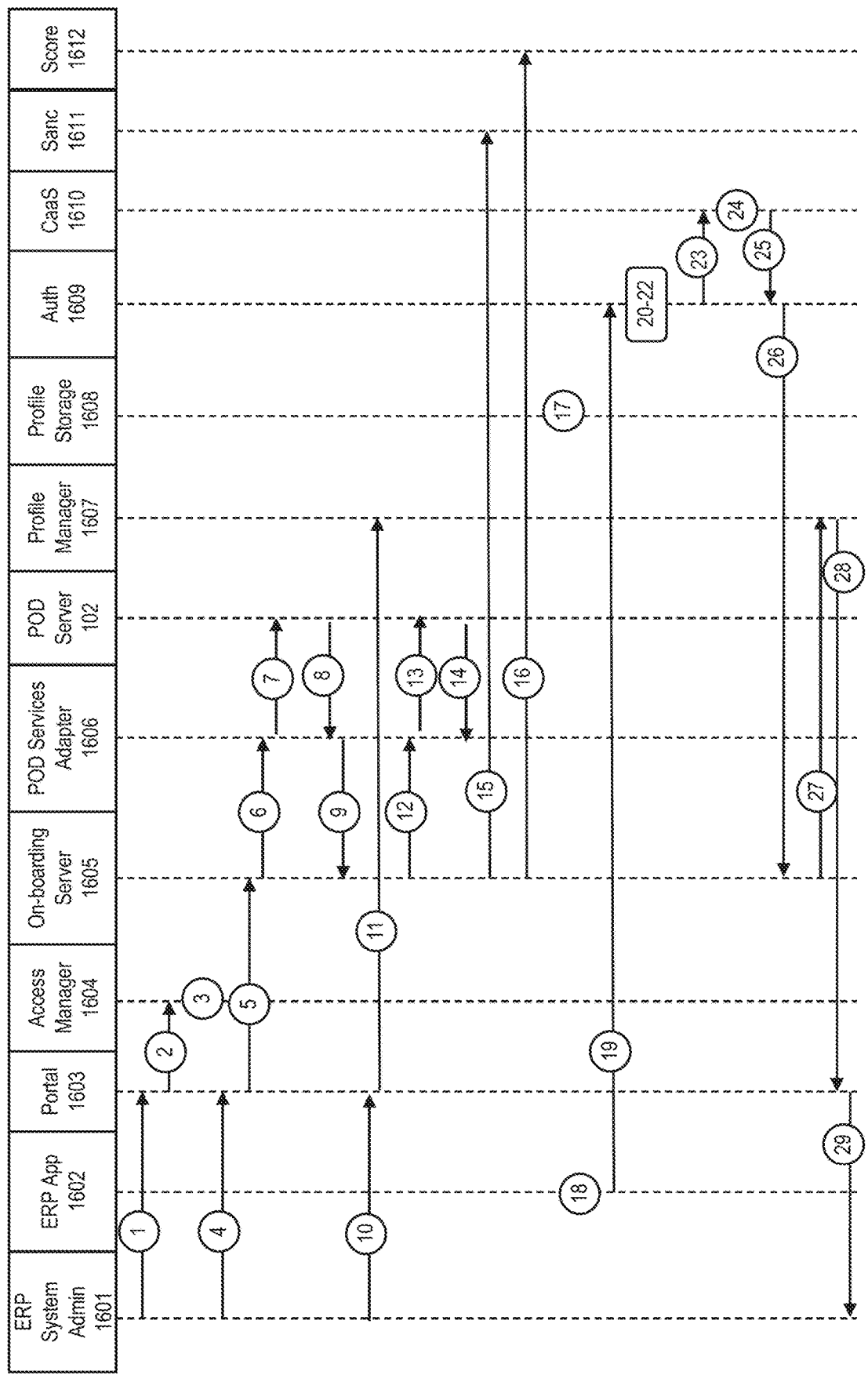

FIG. 16 depicts a message flow for on-boarding a supplier or buyer in accordance with illustrative aspects discussed herein. In some embodiments, system 100 may include one or more of an buyer/supplier ERP system administration server 1601, a buyer/supplier ERP application server 1602, a portal server 1603, an on-boarding server 1605, a POD services adapter 1606, the POD server 102, a profile manager server 1607, a profile storage server 1608, an authentication server 1609, a container-as-a-service (CaaS) server 1610, a sanctions server 1611, a score server 1612, etc. Each of these servers can be embodied by a computing device such as the computing device described in FIG. 8. Each of these servers may be communicatively coupled together via one or more wired and/or wireless networks. In some instance, functionality of access manager 1604, on-boarding server 1605, POD services adapter 1606, profile manager server 1607, profile storage server 1608, authentication server 1609, CaaS server 1610, sanctions server 1611, and score server 1612 may be embodied and executed as modules in POD server 102.

At step 1, the buyer/supplier ERP system administration server 1601 creates portal login credentials for a buyer/supplier and sends them to the buyer/supplier portal server 1603. At step 2, buyer/supplier portal server 1603 sends the portal login credentials to the access manager server 1604. At step 3, the access manager server stores the received portal login credentials. At step 4, buyer/supplier ERP system administration server 1601 creates and sends to the buyer/supplier portal server 1603 buyer's/supplier's basic identification information (e.g., name, etc.). At step 5, the buyer/supplier portal server 1603 sends to the on-boarding server 1605 buyer's/supplier's basic identification information. At step 6, on-boarding server 1605 checks if the buyer/supplier is already on-boarded using a database of buyer/supplier identifiers created by the on-boarding server 1605 during on-boarding.

If the buyer/supplier is already on-boarded, steps 7-9 are performed. Based on a request from the on-boarding server, the POD services adapter server 1606 requests, at step 7, the supplier/buyer profile information from the POD server 102. At step 8, POD server 102 sends the supplier/buyer profile information to the POD services adapter server 1606, which, in turn, forwards the profile information to on-boarding server 1605 at step 9. In response, the on-boarding server 1605 may send a notification that the supplier/buyer is already on-boarded to the buyer/supplier ERP application server 1602.

If the buyer/supplier is not already on-boarded, steps 10-17 are performed. At step 10, after receiving an indication from the on-boarding server 1605 that the buyer/supplier has not yet been on-boarded, the buyer/supplier ERP system administration server 1601 creates buyer/supplier profile information (based on information input by the buyer/supplier) and sends the profile information to the buyer/supplier portal server 1603, which, in turn, forwards the profile information to the profile manager server 1607 at step 11. At step 12, the on-boarding server 1605 creates a buyer/supplier identifier for the buyer/supplier to track on-boarding of the buyer/supplier (see step 6) and sends the identifier to the POD services adapter server 1606, which, in turn, stores and forwards, the identifier to the POD server 102 at step 13. At step 14, POD server 102 stores the identifier as well as sends the identifier back to the POD services adapter server 1606. At step 15, the on-boarding server 1605 sends a request to check sanctions on buyer/supplier to the sanctions server 1611, which is responsible for tracking sanctions on buyers and suppliers. If there are sanctions, on-boarding may be terminated. Otherwise, on-boarding may continue. The sanctions server 1611 may notify one or more of the other servers of the sanctions result including, for example, profile storage server 1608 and buyer/supplier ERP application server 1602. At step 16, the on-boarding server 1605 sends, to the scoring server 1612, a request for a reputation score of the buyer/supplier. The scoring server 1612 may generate a reputation score of the buyer/supplier based on information of the buyer/supplier including, for example, a credit score, etc. If the generated reputation score is less than a preset minimum reputation score threshold, on-boarding may be terminated. Otherwise, on-boarding may continue. The score server 1612 may notify one or more of the other servers of the sanctions result including, for example, profile storage server 1608 and buyer/supplier ERP application server 1602.

If there are no sanctions and the generated reputation score for the buyer/supplier is equal to or greater than the preset minimum reputation score threshold, the profile storage server 1608, at step 17, stores the buyer/supplier identifier. At step 18, the buyer/supplier ERP application server 1602 generates a public-private key pair and sends, at step 19, a request including the public-private key pair to the authentication server 1609. At step 20, the authentication server 1609 stores the public key for subsequent service authentication. At step 21, the authentication server 1609 derives a symmetric message level encryption key from the public key. At step 22, the authentication server 1609 stores the message level encryption key. At step 23, the authentication server 1609 forwards the received request to the CaaS server 1610. At step 24, the CaaS server 1609 signs a certificate for the buyer/supplier using a POD root conditional access token. At step 25, the CaaS server 1609 sends the signed certificate to authentication server 1609, which, in turn, sends the signed certificate to the on-boarding server 1605 at step 26. At step 27, the on-boarding server 1605 provides the signed certificate to the profile manager server 1607 for storage. At step 28, the profile manager server 1607 sends an indication that the buyer/supplier has been on-boarded to the portal server 1603. At step 29, a confirmation message indicating that the buyer/supplier has been on-boarded is sent from the portal server 1603 to the ERP system administration server 1601.

Figure 17:
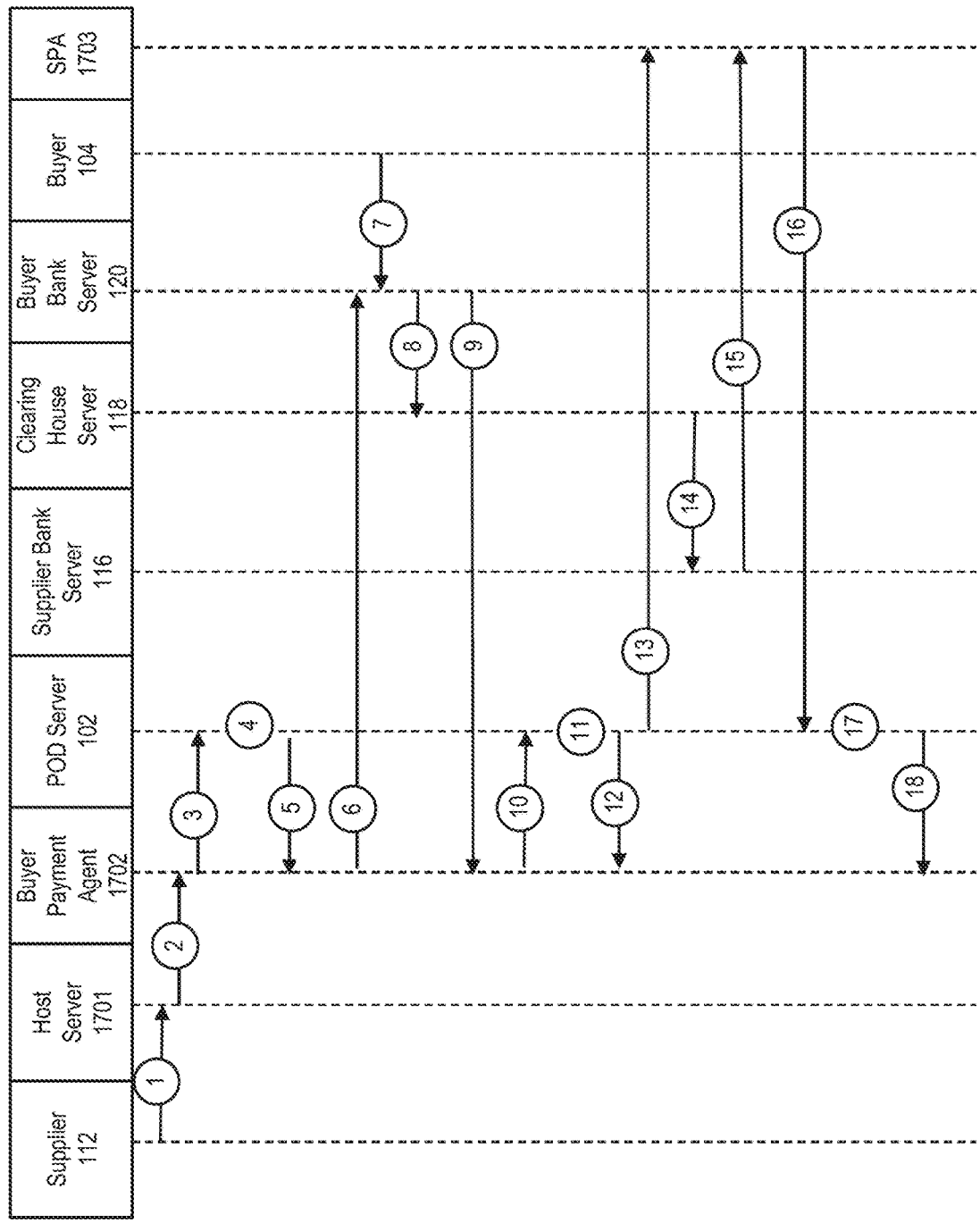

FIG. 17 depicts a message flow for an account-to-account credit transfer for a real-time payment and via a buyer-initiated payment instruction according to one or more aspects discussed herein. In some embodiments, system 100 may include supplier 112, a host server 1701, a buyer payment agent 1702, the POD server 102, the supplier bank server 116, the clearing house server 118, and buyer bank server 120, the buyer 104, and a supplier payment agent (SPA) server 1703. Each of these servers can be embodied by a computing device such as the computing device described in FIG. 8. Each of these servers may be communicatively coupled together via one or more wired and/or wireless networks.

At step 1, supplier 112 via its computing device (e.g., a server) provides invoice data to the host server 1701. Host server 1701 may be a buyer agent hosted by a supplier portal or a supplier manual. At step 2, host server 1701 sends the invoice data to the buyer payment agent installed on a computing device (e.g., a server). At step 3, the buyer payment agent 1702 generates payment instructions and sends the instructions to POD server 102. POD server 102, at step 4, generates a pending status for the transaction and, at step 5, sends a response including the pending status, supplier account information, and a unique payment identifier to buyer payment agent 1702. At step 6, buyer payment agent 1702 generates a RTP credit transfer request including the buyer account information, supplier account information, transaction information (e.g., invoice data, amount to transfer) and payment identifier and sends the RTP request to buyer bank server 120. The buyer bank server 120 may transmit a notification of the payment request to the buyer 104 via its computing device. At step 7, buyer bank server 120 receives an authorize credit transfer message from a computing device of the buyer 104. Buyer bank server 120, at step 8, transfers credit from the buyer's account to the clearing house server 118 and, at step 9, sends, to the buyer payment agent 1702, a response including a status indication of "submitted" to indicate that the buyer's credit has been transferred to the clearing house. At step 10, buyer payment agent 1702 sends, to POD server 102, an instrument to update status of transaction to submitted. POD server 102, at step 11, changes the status of the transaction to submitted and, at step 12, sends an indication of the changed status to buyer payment agent 1702. At step 13, POD server 102 sends a payment-submitted notification to SPA server 1703. At step 14, the clearing house server 118 sends a real-time payment (e.g., transfers buyer's credit) to the supplier's bank server 116. At step 15, supplier bank server 116 sends a payment approval to the SPA server 1703. At step 16, the SPA server sends, to the POD server 102, the payment approval. At step 17, POD server 102 updates the status of the transaction to "approved". At step 18, POD server 102 sends approval of the transaction (e.g., via a web hook) to the buyer payment agent 1702.

Figure 18:
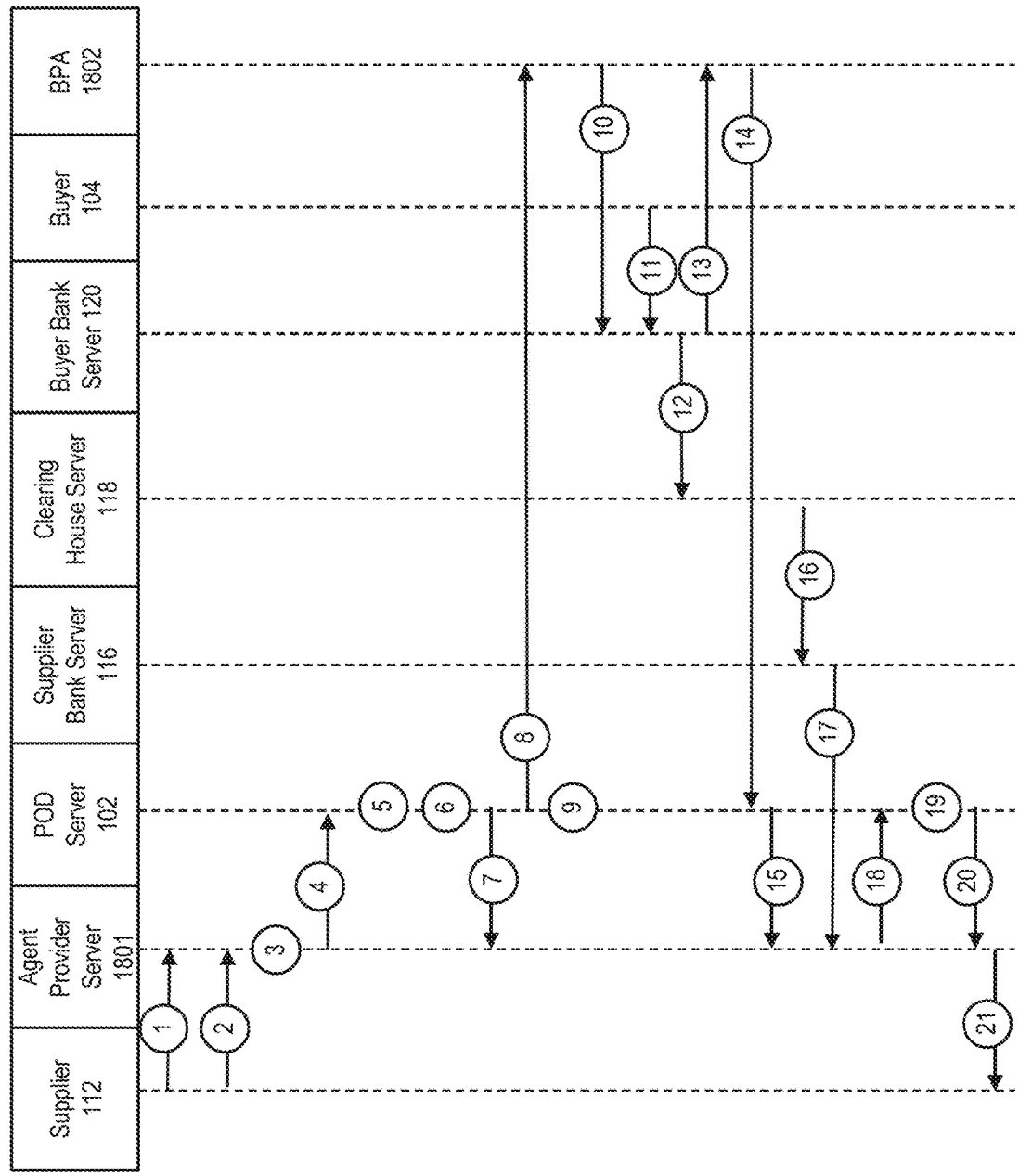

FIG. 18 depicts a message flow for an account-to-account credit transfer and RTP using an agent initiated payment instrument and an agent solution acting on behalf of the supplier in accordance with one or more aspects described herein. In some embodiments, system 100 may include one or more of a supplier 112, an agent provider server 1801, POD server 102, supplier bank server 116, clearing house server 118, buyer bank server 120, buyer 104, and a buyer payment agent (BPA) server 1802. Each of these servers can be embodied by a computing device such as the computing device described in FIG. 8. Each of these servers may be communicatively coupled together via one or more wired and/or wireless networks. The agent solution (AS) supports both buyer and supplier payment agents on sales enablement, integration services and/or data services.

At step 1, the supplier 112, via a computing device, logs into agent provider server 1801 hosted by supplier portal. At step 2, the supplier 112, via its computing device and the portal, creates a profile or manually enters invoice data and supplier bank account information and sends this information to the agent provider server 1801. The agent provider server 1801, at step 3, creates a payment instrument request using the received supplier information and invoice data and, at step 4, sends the request to the POD server 102, which, at step 5, validates the payment. At step 6, the POD server 102 changes the status of the transaction to "received". At step 7, the POD server 102 sends, to the agent provider server 1801, a response indicated that a request for payment has been received. At step 8, the POD server 102 sends a notification of the payment request to the BPA server 1802. The notification may include one or more of transaction information (e.g., invoice data, amount to transfer), buyer/supplier account information, and a payment identifier. At step 9, the POD server 102 changes status of the transaction to "submitted". At step 10, the BPA server 1802 sends, to the buyer bank server 120, a RTP request to transfer credit from buyer to supplier. The request includes one or more of supplier account information, buyer account information, and the payment identifier. In response, the BPA server 1802 may notify the buyer 104 of the request for payment by sending a message to the buyer's computing device. At step 11, the buyer 104, via a computing device, sends an authorization of transfer credit to the buyer bank server 120, which sends a RTP credit transfer to the clearing house server 118 at step 12. At step 13, the buyer bank server 120 sends a payment approved message to the BPA server 1802. At step 14, the BPA server 1802 sends, to the POD server 102, a notification that the buyer has approved the payment. At step 15, the POD server 102 sends, to the agent provider server 1801, a notification of the payment request approval, which may be a web hook. At step 16, the clearing house server 118 sends, to the supplier bank server 116, the RTP credit transfer. At step 17, the supplier bank server 116 sends, to the agent provider server 1801, an indication that the payment has been received. At step 18, the agent provider server 1801 sends, to the POD server 102, an instruction to update the status of the transaction to "approved". At step 19, the POD server 102 changes the status of the transaction to "approved" and, at step 20, sends the updated status indicating payment approval to the agent provider server 1801. At step 21, the agent provider server 1801 sends, to the computing device of the supplier 112, a notification that the payment has been received by the supplier's bank.

Figure 19:
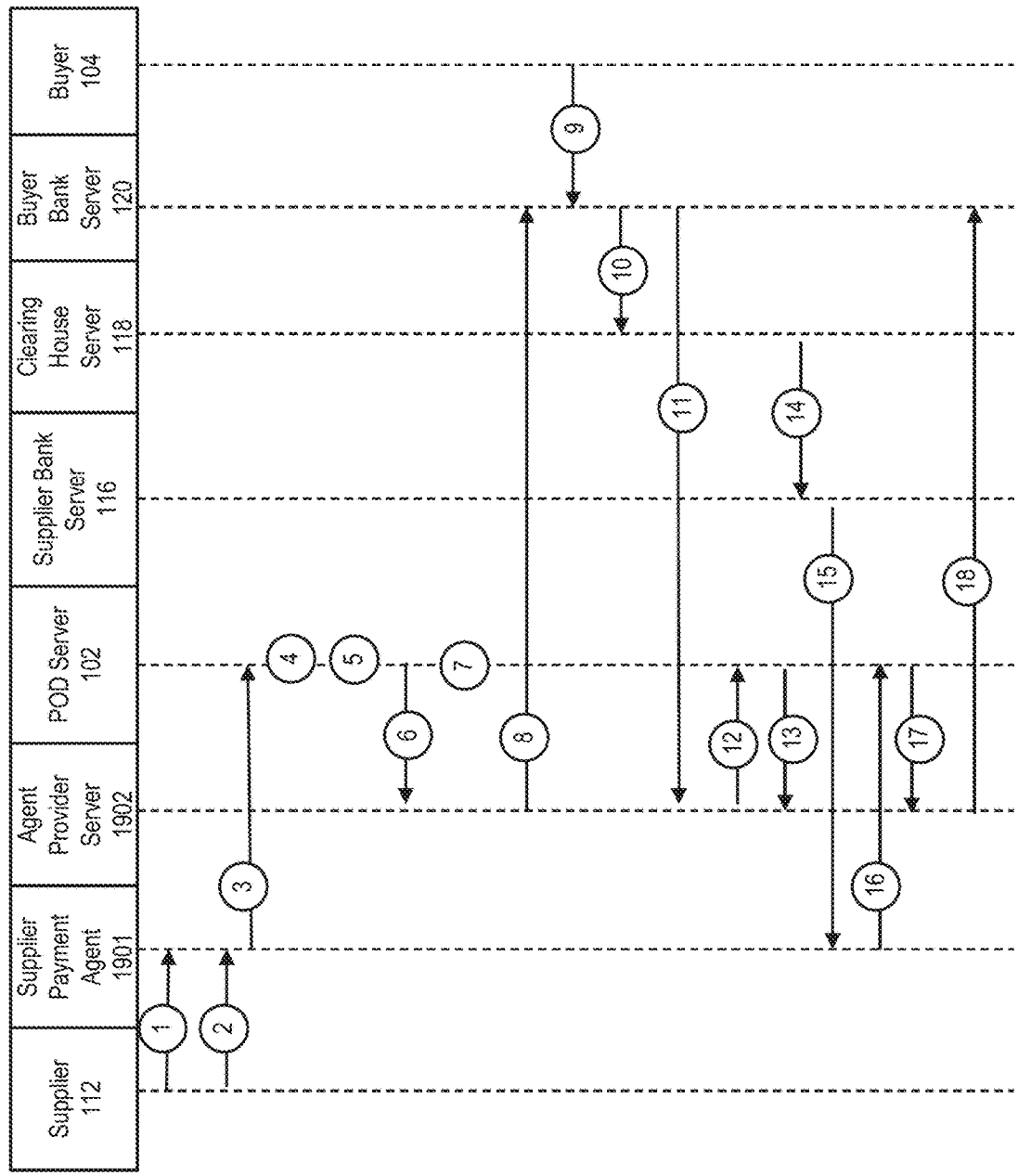

FIG. 19 depicts a message flow for an account-to-account credit transfer and RTP when the agent provider acts on behalf of the buyer 104 in accordance with one or more aspects described herein. In some embodiments, system 100 may include one or more of a supplier 112, a supplier payment agent 1901 installed on a computing device, an agent provider server 1902, POD server 102, supplier bank server 116, clearing house server 118, buyer bank server 120, and buyer 104. Each of these servers can be embodied by a computing device such as the computing device described in FIG. 8. Each of these servers may be communicatively coupled together via one or more wired and/or wireless networks.

At step 1, supplier 112, via a computing device, logs into and agent provider server-hosted buyer portal. At step 2, the supplier 112, via its computing devices, creates a profile or manually enters invoice data and supplier bank account information and sends this information to the supplier payment agent 1901. At step 3, the supplier payment agent 1901 sends a request to create payment instruction including supplier information to the POD server 102. At step 4, POD server 102 validates the payment. At step 5, POD server 102 changes status of transaction to "received". At step 6, POD server 102 transmits a request for payment to agent provider server 1902. The request may include one or more of buyer account information, supplier account information, transaction information (e.g., invoice data, amount to transfer), and a transaction identifier. At step 7, POD server 102 changes status of transaction to submitted. At step 8, the agent provider solution sends, to the buyer bank server 120, a RTP request including buyer account information, supplier account information, transaction information (e.g., invoice data, amount to transfer), and payment identifier. In response, the buyer bank server 120 may notify the buyer 104 of the request for payment by sending a message to the buyer's computing device. At step 9, the buyer, via its computing device, sends an authorization to transfer funds to the buyer bank server 120. At step 10, the buyer bank server 120 sends, to the clearing house server 118, a RTP credit transfer from buyer. At step 11, the buyer bank server 120 sends, to the agent provider server 1902, an indication that the payment was approved by the buyer 104. At step 12, the agent provider server 1902 sends, to the POD server 102, the indication. At step 13, the POD server 102 sends a web hook for the notification to the agent provider server 1902. At step 14, the clearing house server sends, to the supplier bank server 114, the RTP credit transfer. At step 15, the supplier bank server 116 sends the supplier payment agent an indication that the payment has been received. At step 16, the supplier payment agent sends, to the POD server 102, an instruction to change the status of the transaction to "received". The instruction also includes the payment identifier. At step 17, the POD server changes its status of transaction to "received" and sends the status to the agent provider server 1902, which, in turn, forwards the status to the buyer bank server 120 at step 18.

Figure 20:
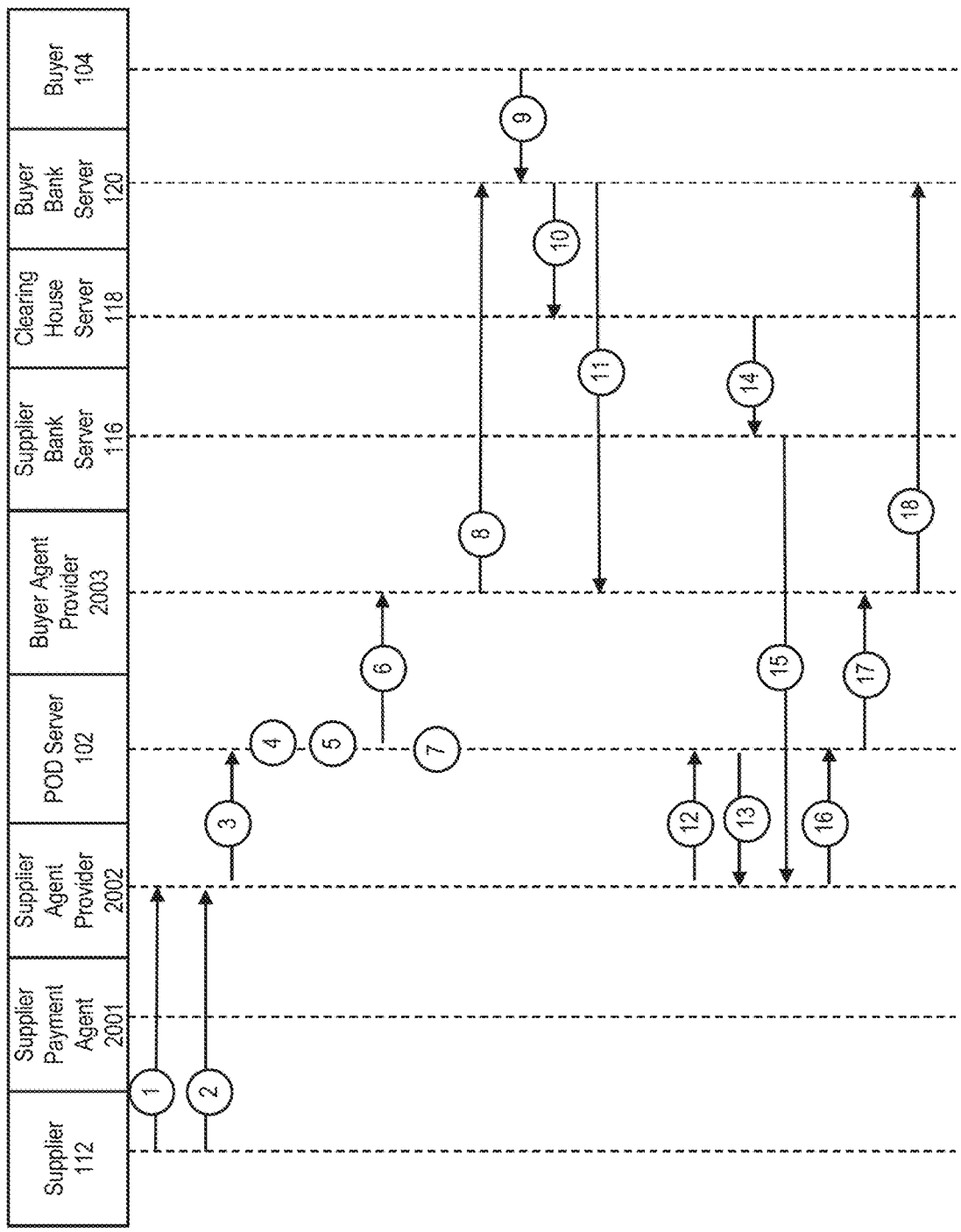

FIG. 20 depicts a message flow for an account-to-account credit transfer and RTP when agent providers act on behalf of both buyer and supplier in accordance with one or more aspects described herein. In some embodiments, system 100 may include one or more of a supplier 112, a supplier payment agent 2001 installed on a computing device, a supplier agent provider server 2002, POD server 102, buyer agent provider server 2003, supplier bank server 116, clearing house server 118, buyer bank server 120, and buyer 104. Each of these devices can be embodied by a computing device such as the computing device described in FIG. 8. Each of these devices may be communicatively coupled together via one or more wired and/or wireless networks.

At step 1, the supplier 112, via a computing device, logs into the agent provider hosted supplier portal. At step 2, the supplier 112, via its computing device, creates a profile or manually enters invoice data and supplier bank account information and sends this information to the supplier agent provider 2002. At step 3, the supplier agent provider 2002 sends, to the POD server 102, a request for a create payment instruction including the supplier information. At step 4, the POD server validates the payment request. At step 5, the POD server 102 changes a status for the transaction to "received". At step 6, the POD server 102 sends, to the buyer agent provider 2003, a request for payment. The request may include one or more of supplier account information, buyer account information, transaction information (e.g., invoice data, transaction amount), and a payment identifier. At step 7, the POD server 102 changes status of transaction to "submitted". At step 8, the buyer agent provider 2003 sends, to the buyer bank server 120, an RTP request including one or more of supplier account information, buyer account information, transaction information (e.g., invoice data, transaction amount), and the payment identifier. In response, the buyer bank server 120 may notify the buyer 104 of the request for payment by sending a message to the buyer's computing device. At step 9, the buyer 104, via its computing device, transmits, to buyer bank server 120, an authorization to transfer credit to supplier. At step 10, the buyer bank server 120 sends, to the clearing house server 118, an RTP credit transfer from the buyer's account. At step 11, the buyer bank server 120 sends, to the buyer agent provider 2003, a payment approved indication. At step 12, the supplier agent provider 2002 sends an approved payment notification to the POD server 102, which, in turn, sends a web hook for the notification back to the supplier agent provider 2002 in step 13. At step 14, the clearing house server 118 sends, to the supplier bank server 116, the RTP credit transfer. At step 15, the clearing house server 118 sends, to the supplier agent provider 2002, a notification that the payment has been received. At step 16, the supplier agent provider 2002 sends, to the POD server 102, an instruction to change status to "received". At step 17, the POD server 102 changes status of transaction to "received" and send a notification of the received status to the buyer agent provider 2003. At step 18, the buyer agent provider 2003, sends to the buyer bank server 120, the notification.

Figure 21:
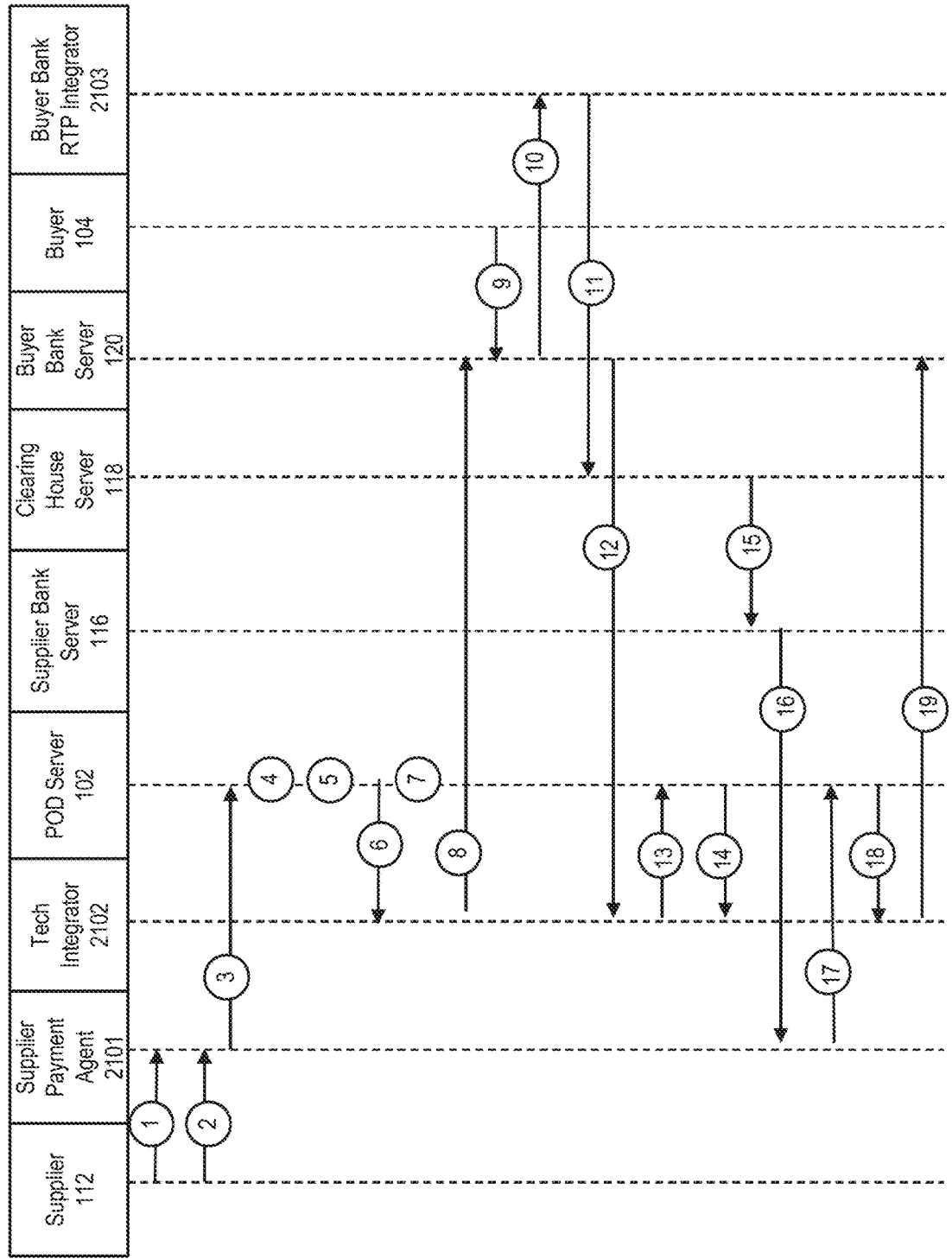

FIG. 21 depicts a message flow for an account-to-account credit transfer using a technology integrator service on behalf of buyer 104 and via RTP rails in accordance with one or more aspects described herein. In some embodiments, system 100 may include one or more of supplier 112, supplier payment agent 2101 installed on a computing device, technology integrator service server 2102, POD server 102, supplier bank server 116, clearing house server 118, buyer bank server 120, buyer 104, and buyer bank RTP integrator server 2103. Each of these devices may be embodied by a computing device such as the computing device described in FIG. 8. Each of these devices may be communicatively coupled together via one or more wired and/or wireless networks.

At step 1, supplier 112 logs into an agent solution provider-hosted buyer portal. This portal may be provided by the supplier payment agent 2101. At step 2, supplier 112 may, via its computing device and the portal, create a profile or manually enter invoice data and supplier bank account information. At step 3, the supplier payment agent 2101 creates a request to create payment instrument. The request includes supplier's account information and is sent to POD server 102. At step 4, the POD server 102 validates the payment information including, for example, the supplier's account credentials. At step 5, the POD server sets a status for the transaction to "received". At step 6, POD server 102 transmits, to technology integration service server 2102, a request for payment to transfer credit from the buyer 104 to the supplier 112. The request may include one or more of the supplier account information, the buyer account information, transaction information (e.g., amount), and/or a payment identifier for the transaction. Once the request has been sent, the POD server 102 changes, at step 7, the status of the transaction to "submitted". At step 8, technology integrator service server 2102 sends, to buyer bank server 120, an RTP request including one or more of the supplier account information, the buyer account information, transaction information (e.g., amount), and/or a payment identifier for the transaction. In response, buyer bank server 120 may notify buyer 104 of the received RTP request (e.g., by transmitting a message to buyer's computing device for display). At step 9, buyer 104 may approve the transaction and send, via its computing device, an authorization of the credit transfer to the buyer bank server 120. At step 10, the buyer bank server 120 sends, to the buyer's bank RTP integrator server 2103, a notification that the transfer is authorized. The notification may include one or more of the supplier account information, the buyer account information, transaction information (e.g., amount), and/or a payment identifier for the transaction. At step 11, buyer's bank RTP integrator server 2103 sends, to the clearing house server 118, a RTP credit transfer funded from the buyer's account. At step 12, the buyer bank server 120 sends, to the technology integrator service server 2102, an indication that the payment has been approved. The indication may include the payment identifier for the transaction. At step 13, the technology integrator service server 2102 sends, to the POD server 102, a notification that the credit transfer has been approved. The notification may include the transaction identifier for the transaction. At step 14, the POD server 102 sends, to the technology integrator service server 2102, a web hook of notification that the credit transfer has been approved. At step 15, the clearing house server 118 sends to the supplier bank server 116 the RTP credit transfer to deposit into supplier's account. At step 16, the supplier bank server 116 sends, to the supplier payment agent 2101, a notification that the credit has been transferred from the buyer's account to the supplier's account. At step 17, the supplier payment agent 2101 sends, to the POD server 102, an instruction to update the status of the transaction to "received". The instruction may include the payment identifier of the transaction. At step 18, the POD server 102 changes the status of the transaction to supplier received payment and sends, to the technology integrator service server 2102, an instruction to change status of transaction to supplier received payment. At step 19, the technology integrator service 2102 updates the status of the transaction as instructed and send a notification that the credit has been received to the buyer bank server 120.

Embodiments (or portions thereof) may be used together with any other embodiment (or portions thereof) described herein and/or incorporated by reference.

Techniques consistent with the present disclosure provide, among other features, systems and methods for real-time package delivery invoice updating and account-to-account payment. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for real-time invoice updating and account-to-account payment, comprising:
    downloading, by a delivery computing device within a payment on delivery (POD) system, a POD software application from a processing server;
    installing, by the delivery computing device, the POD software application thereon;
    presenting, on an interface of the delivery computing device, to a recipient at a delivery location, an invoice specific to the recipient for delivery of goods;
    modifying, by the delivery computing device, using the POD software, the invoice of the recipient in response to the recipient interacting with the interface;
    dynamically updating, by the delivery computing device, the invoice for presentation to the recipient;
    receiving, by a receiving device of the processing server, from the delivery computing device, the invoice data;
    translating, by a processing device of the processing server, the received invoice data from an enterprise resource planning (ERP) format to an ISO 20222 format;
    generating, by the processing device of the processing server, a request for payment (RFP) message based on the translated invoice data;
    transmitting, by a transmitting device of the processing server, the RFP message to a financial institution associated with the recipient;
    receiving, by the receiving device of the processing server, a payment confirmation for the invoice based on a real-time payment from the financial institution;
    generating, by the processing device of the processing server, reconciliation data based on the payment confirmation and the invoice data; and
    transmitting, by the transmitting device of the processing server, the reconciliation data to at least a computing device of the recipient.

2. The method of claim 1, wherein the invoice data is further associated with a schedule of deliveries of a distributor, and wherein the recipient is one of a plurality of scheduled deliveries.

3. The method of claim 1, wherein the modification to the invoice is based on increasing a number of goods for delivery to the recipient.

4. The method of claim 1, wherein the invoice data comprises a picture or video of goods being delivered to the recipient.

5. The method of claim 1, wherein the invoice data comprises a recipient authentication code for recipient payment authentication, wherein the RFP message comprises the recipient authentication code.

6. The method of claim 1, wherein the modification of the invoice includes moving a first icon displayed on the interface of the delivery computing device to substantially align with a second icon displayed on the interface, wherein the first and second icons have the same shape; and wherein the first icon includes an indication of a total amount to pay for delivery of goods and an instruction to align the two icons to accept the total amount to pay as correct and initiating payment.

7. The method of claim 1, wherein the RFP message comprises an account number of the recipient for the financial institution associated with the recipient from which to obtain the real-time payment, and wherein the RFP message comprises an account number of a distributor for the financial institution associated with the distributor to credit the real-time payment.

8. A system for real-time invoice updating and account-to-account payment, comprising:
    a delivery computing device; and
    a processing server,
    wherein the delivery computing device is configured to
        download a payment on delivery (POD) software application from the processing server and install the POD software application thereon, present, on an interface of the delivery computing device, to a recipient at a delivery location, an invoice specific to the recipient for delivery of goods, modify, using the POD software, the invoice of the recipient in response to the recipient interacting with the interface, dynamically update the invoice for presentation to the recipient;

wherein the processing server includes a receiving device, a transmitting device, and a processing device, wherein the receiving device of the processing server is configured to receive:

invoice data, from the delivery computing device, and a payment confirmation for the invoice based on a real-time payment from a financial institution associated with the recipient;

wherein the processing device of the processing server is configured to translate the received invoice data received from an enterprise resource planning (ERP) format to an ISO 20222 format;

generate a request for payment (RFP) message based on the translated invoice data; and generate reconciliation data based on the payment confirmation and the invoice data;

wherein the transmitting device of the processing server is configured to transmit:

the RFP message to the financial institution associated with the recipient; and the reconciliation data to at least a computing device of the recipient.

9. The system of claim 8, wherein the invoice data is further associated with a schedule of deliveries of the distributor, and wherein the recipient is one of a plurality of scheduled deliveries.

10. The system of claim 8, wherein the modification to the invoice is based on increasing a number of goods for delivery to the recipient.

11. The system of claim 8, wherein the invoice data comprises a picture or video of goods being delivered to the recipient.

12. The system of claim 8, wherein the invoice data comprises a recipient authentication code for recipient payment authentication, wherein the RFP message comprises the recipient authentication code.

13. The system of claim 8, wherein the modification of the invoice data includes moving a first icon displayed on the interface of the delivery computing device to substantially align with a second icon displayed in the interface, wherein the first and second icons have the same shape; and wherein the first icon includes an indication of a total amount to pay for delivery of goods and an instruction to align the two icons.

14. The system of claim 13, wherein the RFP message comprises an account number of the recipient for the financial institution associated with the recipient from which to obtain the real-time payment, and wherein the RFP message comprises an account number of a distributor for the financial institution associated with the distributor to credit the real-time payment.

* * * * *